US011853435B1

(12) United States Patent
Welker

(10) Patent No.: US 11,853,435 B1
(45) Date of Patent: Dec. 26, 2023

(54) INTERACTIVE OBFUSCATION AND INTERROGATORIES

(71) Applicant: Ryan Welker, Layton, UT (US)

(72) Inventor: Ryan Welker, Layton, UT (US)

( * ) Notice: Subject to any disclaimer, the term of this patent is extended or adjusted under 35 U.S.C. 154(b) by 239 days.

(21) Appl. No.: 16/897,993

(22) Filed: Jun. 10, 2020

Related U.S. Application Data

(60) Provisional application No. 62/861,905, filed on Jun. 14, 2019, provisional application No. 62/892,329, filed on Aug. 27, 2019.

(51) Int. Cl.
  *G06F 17/00* (2019.01)
  *G06F 21/60* (2013.01)
  *H04L 9/06* (2006.01)
  *G06N 20/00* (2019.01)

(52) U.S. Cl.
  CPC .......... *G06F 21/602* (2013.01); *H04L 9/0618* (2013.01); *G06N 20/00* (2019.01); *H04L 2209/16* (2013.01)

(58) Field of Classification Search
  CPC ...... G06F 21/602; G06N 20/00; H04L 9/0618
  See application file for complete search history.

(56) References Cited

U.S. PATENT DOCUMENTS

| 8,516,601 | B2 | 8/2013 | Goodwin et al. |
| 2006/0101285 | A1* | 5/2006 | Chen .................. H04L 63/08 713/193 |
| 2008/0228824 | A1* | 9/2008 | Kenedy ............... G16H 20/30 |
| 2012/0284801 | A1 | 11/2012 | Goodwin et al. |
| 2016/0330237 | A1 | 11/2016 | Edlabadkar |

* cited by examiner

*Primary Examiner* — Ellen Tran
(74) *Attorney, Agent, or Firm* — Foley & Lardner LLP

(57) ABSTRACT

Ingesting large quantities of data in a secure manner can be problematic, particularly processing types of data streams to determine the content of the data stream. As provided herein, a context associated with the data stream can be ascertained by mapping the content of data stream using contextual maps. The content and context can then be further processed in order to generate appropriate responses. In addition, obfuscation can be applied to the content such that the original content is lost while the contextual meaning associated with the content is maintained. In this way, an understanding can persist of the original content without retaining the underlying raw data.

12 Claims, 18 Drawing Sheets

(11 of 18 Drawing Sheet(s) Filed in Color)

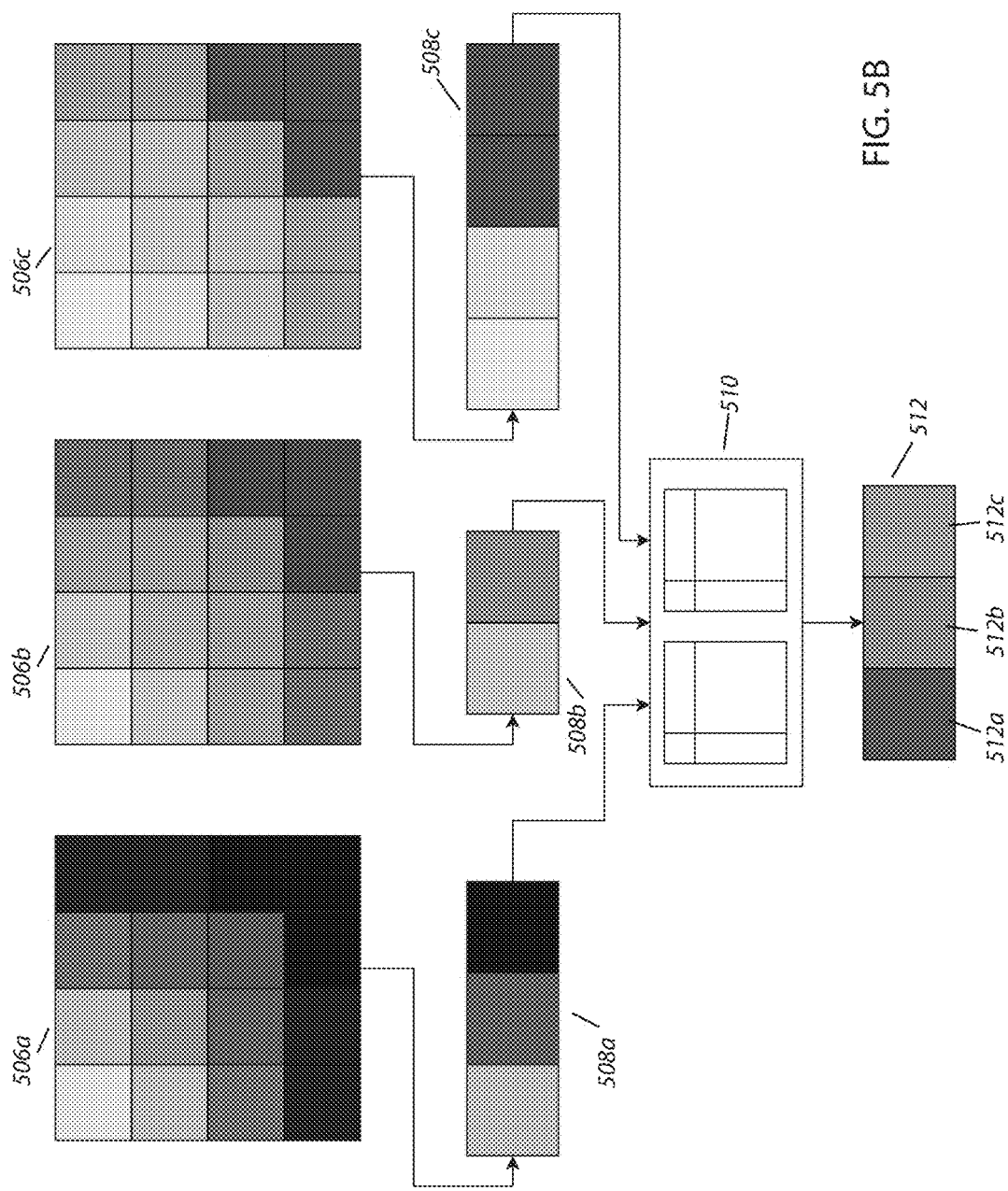

ENCRYPTED NOMENCLATURE BANK

| | | | |
|---|---|---|---|
| spring | box | deserted | vacuous |
| adjust | spiky | minor | change |
| steep | hill | untidy | draconian |
| birthday | lace | adorable | receptive |
| theory | board | harmonious | depend |
| panicky | piquant | nauseating | common |
| majestic | succinct | aftermath | honorable |
| overtake | rambunctious | judge | defiant |
| complex | land | pacify | prepare |
| provide | train | babies | hear |
| grandfather | moo | gun | insidious |
| theory | harmonious | space | company |
| offbeat | flop | authority | shit |
| unsuitable | verdant | history | attraction |
| shatter | thrust | terminate | sting |
| study | be | modern | real |
| handsome | exuberant | stick | flawless |
| coast | nauseating | excellent | kaput |
| report | produce | cord | ill |
| kitty | ugliest | guarded | vomit |
| clean | disgusted | alcoholic | hope |
| sponge | weak | crush | muddled |
| practise | heavenly | bikes | event |
| stick | hope | confess | delete |
| xenophobic | work | actor | war |
| wine | shorten | madly | |
| thump | boats | oppress | |
| stale | sanction | hideous | |
| explain | development | hang | |
| nation | green | hope | 1010 |

INTERACTIVE OBFUSCATION AND INTERROGATORIES

CROSS-REFERENCE TO RELATED APPLICATIONS

This application claims priority to and the benefit of U.S. Provisional Patent Application Ser. No. 62/861,905, filed Jun. 14, 2019 and titled "INTERACTIVE OBFUSCATION AND INTERROGATORIES," which is incorporated herein by reference and U.S. Provisional Patent Application Ser. No. 62/892,329, filed Aug. 27, 2019 and titled "THREE-DIMENSIONAL MAPPING FOR DATA PROTECTION," which is incorporated herein by reference. The foregoing are incorporated herein by this reference in their entirety.

BACKGROUND

Technical Field

This disclosure generally relates to ingesting large quantities of data in a secure manner. More specifically, the present disclosure relates to processing any type of data stream to determine the content of the data stream. By mapping the content of data stream using contextual maps, a context associated with the data stream is also ascertained. The content and context can then be further processed in order to generate appropriate responses. In addition, obfuscation can be applied to the content such that the original content is lost while the contextual meaning associated with the content is maintained. In this way, an understanding can persist of the original content without retaining the underlying raw data.

Related Technology

Many types of data processing environments exist that are configured to ingest large amounts of data from various sources. Typically, such "big data" environments derive their benefits from an ability to store and track large amounts of raw data. The underlying raw data is frequently stored in a manner that allows its origins to be maintained and linked to a particular originating entity, such as a user that produced the content.

While the collection and aggregation of enormous datasets can be helpful for the collector of the information, storing sensitive information can present significant issues. For example, large datasets are expensive to maintain—both in terms of real costs as well as in processing or data management effort. Additionally, in a scenario where sensitive information is stored, that information should be encrypted or otherwise protected to protect the interests of the person or entity the data is tied to. Depending on the implementation, many data systems lack appropriate levels of security. Because of this, personal or sensitive information may be at risk.

Big data repositories can also create a situation where a collector believes that more data is necessarily better. Because of this, more data than is necessary to perform the tasks necessary for the system are often collected, processed, and stored. This is inefficient and can lead to a greater likelihood that sensitive data is lost to an unauthorized party.

Typical big datasets also create the possibility that a collector may learn too much about a subject and use that information nefariously. For example, large datasets are known to have been used to discriminate against their targets.

Similarly, although large datasets can be configured to generate configurable outputs, the meaning of those outputs often require interpretation from a human user. This can introduce error and/or inconsistency regarding the meaning of the underlying data. Further, it may not be desirable or practicable to expose all of the underlying raw data to an end user for use when interpreting results.

Accordingly, there are a number of disadvantages with generating understanding from large datasets that can be addressed.

BRIEF SUMMARY

Implementations of the present disclosure solve one or more of the foregoing or other problems in the art with ingesting large quantities of data in a secure manner. In particular, one or more implementations can include a method for irreversibly encrypting a first dataset while retaining contextual meaning. The method can include receiving a dataset comprising a plurality of discrete portions representing discrete portions of textual information, and for each discrete portion in the dataset, performing a reversible first conversion on the discrete portion, which includes at least (i) mapping each discrete portion within the dataset to a table that correlates the respective discrete portion to a discrete mathematical representation of the respective discrete portion and (ii) adding the discrete mathematical representation of the respective discrete portion to a second dataset that is separate from the first dataset. The method can additionally include identifying one or more groupings of the mathematical representations within the second dataset. For at least one of the groupings, the method includes performing an irreversible second conversion by combining the discrete mathematical representations within the at least one grouping into a blended mathematical representation. The method can further include creating a third dataset that includes at least the blended mathematical representation of the at least one grouping, and in some instances discarding the first dataset and the second dataset.

In one aspect, the method can include performing the irreversible second conversion on each of the groupings such that a single blended mathematical representation is generated for each of the groupings, wherein the third dataset comprises the single mathematical representation generated for each of the one or more groupings.

In one aspect, the mathematical representation of each discrete portion comprises a numerical value representing a color. The second dataset can include the mathematical representations of the respective discrete portions.

In one aspect, the irreversible second conversion includes performing one or more aggregate functions, comprising a summing function, an averaging function, or a weighting function. For example, the irreversible second conversion can include performing the weighted averaging function.

In one aspect, the groupings are configured according to a context associated with the grouping such that each mathematical representation within a particular grouping shares the context.

Embodiments of the present disclosure can additionally include computer systems for providing contextually aware one-way encryption for user data. In one aspect, the computer system includes one or more processors and one or more hardware storage devices having stored thereon computer-executable instructions. When executed by the processor(s), the computer-executable instructions cause the computer system to at least: (i) receive a dataset comprising visual representations of a plurality of discrete textual data, (ii) identify a plurality of contextual groupings from within the plurality of discrete textual data, (iii) for at least one of the contextual groupings, perform a blending function on the discrete textual data that is associated with the at least one contextual grouping, and (iv) store a result of the blending function against a user profile.

In one aspect, the visual representations of the plurality of discrete textual data comprises a separate color for each element within the discrete textual data. The contextual groupings may be based at least on the separate colors.

In one aspect, the blending function comprises an aggregate function. The aggregate function can include an averaging function such that a result of the aggregate function comprises a single result that represents an average of each element within the discrete textual data that is associated with a particular contextual grouping. For example, the single result can be an aggregate color that is directly derived from the other colors within the discrete textual data.

In one aspect, at least one discrete textual data that is used to derive the aggregate color can be represented to a higher degree within the aggregate color than at least one other discrete textual data. Representing the at least one textual data to a higher degree within the aggregate color can occur based on a pre-configured rule.

In one aspect, the aggregate function includes a summing function such that the result of the summing function comprises a single result that represents an additive representation of each element within the discrete textual data that is associated with a particular contextual grouping.

In one aspect, the blending function is irreversible such that the discrete textual data used in the blending function cannot be derived from the result of the blending function.

In one aspect, the visual representations of the plurality of discrete textual data comprise hexadecimal codes.

In one aspect, the visual representations of the plurality of discrete textual data are selected from a set of unique colors.

Embodiments of the present disclosure can additionally include a computer readable hardware storage device having stored thereon computer-executable instructions that are executable by one or more processors of a computing system. When executed, the computer-executable instructions cause the computing system to perform a method for irreversibly encrypting a first dataset while maintaining contextual meaning. The method can include receiving a dataset comprising a plurality of discrete portions representing discrete portions of textual information, and for each discrete portion in the dataset, performing a reversible first conversion on the discrete portion, which includes at least (i) mapping each discrete portion within the dataset to a table that correlates the respective discrete portion to a discrete mathematical representation of the respective discrete portion and (ii) adding the discrete mathematical representation of the respective discrete portion to a second dataset that is separate from the first dataset. The method can additionally include identifying one or more groupings of the mathematical representations within the second dataset. For at least one of the groupings, the method includes performing an irreversible second conversion by combining the discrete mathematical representations within the at least one grouping into a blended mathematical representation. The method can further include creating a third dataset that includes at least the blended mathematical representation of the at least one grouping, and in some instances discarding the first dataset and the second dataset.

Embodiments of the present disclosure can additionally include methods for applying multi-dimensional obfuscation to textual data. An exemplary method can include receiving a plurality of data streams and for at least one data stream of the plurality of data streams, generating a textual dataset representing content elements within the at least one data stream. The method can additionally include applying a first obfuscation dimension to the at least one data stream that includes at least: (i) mapping each element within the textual dataset of the at least one data stream to a textual map, the textual map being configured to associate textual data with a visual representation and (ii) generating a first data structure that comprises only visual representations from the textual map that were derived for each element within the textual dataset. The method can additionally include applying a second obfuscation dimension to the first data structure. The second obfuscation dimension can be derived from a characteristic associated with a user that is linked to the at least one data stream.

In one aspect, the plurality of data streams includes one or more of a video data stream, an audio data stream, a textual data stream, or a metadata data stream. The plurality data streams can include, for example, a video data stream and an audio data stream and the method can additionally include applying an automated content recognition algorithm to generate textual data from the video data stream and the audio data stream that represents the content of the respective stream.

In one aspect, the visual representations within the first obfuscation dimension include discrete colors such that the textual map associates elements within the textual dataset to corresponding colors within the textual map. The textual dataset can include a plurality of unique textual elements, and each of the unique textual elements can correspond to a different color within the textual map.

In one aspect, the textual map is chosen from a plurality of textual maps based on a context that is shared by both the textual map and the element within the textual dataset. In some instances, at least one element within the textual dataset can be mapped to a first textual map and at least one different element within the textual dataset can be mapped to a different textual data map. In some instances, the first textual data map is associated with a first context and the different textual data map is mapped to a different context.

In one aspect, the first data structure includes a separate visual representation for each element within the textual dataset.

In one aspect, the method additionally includes generating a second data structure that includes the results of the second obfuscation dimension. Additionally, or alternatively, the method can include applying a third obfuscation dimension. The third obfuscation dimension can be applied to the second data structure and include one or more aggregating functions. The one or more aggregating functions can result in at least two of the elements within the textual dataset being merged into a single representation such that the second data structure comprises the single representation and not the at least two of the elements.

Embodiments of the present disclosure can include a computer system for providing multi-dimensional obfuscation to textual data. In one aspect, the computer system includes one or more processors and one or more hardware storage devices having stored thereon computer-executable instructions. When executed by the processor(s), the computer-executable instructions cause the computer system to at least: (i) receive a plurality of data streams, (ii) for at least one of the plurality of data streams, generate a textual dataset representing content elements within the at least one data stream, (iii) apply a first obfuscation dimension to the at least one data stream, including at least (a) mapping each element within the textual dataset of the at least one data stream to a textual map, the textual map being configured to associate textual data with a visual representation and (b) generating a first data structure that comprises only visual representations from the textual map that were derived for each element within the textual dataset, and (iv) apply a second obfuscation dimension to the first data structure that is derived from a characteristic associated with a user that is linked to the at least one data stream.

In one aspect, the plurality of data streams includes one or more of a video data stream, an audio data stream, a textual data stream, or a metadata data stream. The plurality data streams can include, for example, a video data stream and an audio data stream and the method can additionally include applying an automated content recognition algorithm to generate textual data from the video data stream and the audio data stream that represents the content of the respective stream.

In one aspect, the visual representations within the first obfuscation dimension include discrete colors such that the textual map associates elements within the textual dataset to corresponding colors within the textual map. The textual dataset can include a plurality of unique textual elements, and each of the unique textual elements can correspond to a different color within the textual map.

In one aspect, the textual map is chosen from a plurality of textual maps based on a context that is shared by both the textual map and the element within the textual dataset. In some instances, at least one element within the textual dataset can be mapped to a first textual map and at least one different element within the textual dataset can be mapped to a different textual data map. In some instances, the first textual data map is associated with a first context and the different textual data map is mapped to a different context.

Embodiments of the present disclosure additionally include methods, executed at a computer system, for generating contextually relevant verbal responses using user-specific nomenclature. An exemplary method can include receiving an indication of an occurrence of a contextual event, identifying one or more response templates, identifying a modifiable element within the identified response template(s), selecting, from within a user specific nomenclature, a replacement element, modifying the response template by replacing the modifiable element with the replacement element to create a modified response template, and causing the modified response template to be displayed.

In one aspect, the indication of the occurrence of the contextual event is triggered by a content ingestion system coupled to the computer system.

In one aspect, the contextual event includes an event characterized by a textual data stream such that at least one element within the textual data stream denotes a context of the contextual event. In some instances, the contextual event is derived from a non-textual data source, such as a video stream.

In one aspect, the identified response template(s) have a context that matches the contextual event.

In one aspect, the user specific nomenclature comprises a dataset of textual elements associated with a historical use of a particular entity. In some instances, the contextual event is identified as being linked to the particular entity.

In one aspect, the modifiable element is a textual phrase comprising at least two words and the replacement element is a different textual phrase.

In one aspect, the textual phrase and the different textual phrase have different word lengths.

In one aspect, the replacement element and the modifiable element are within a threshold distance of each other on a contextual mapping. In some instances, the contextual mapping includes a plurality of textual elements positioned according to a contextual meaning of each textual element such that textual elements with more similar contextual meanings are positioned closer within the textual map than textual elements with more dissimilar contextual meanings.

Embodiments of the present disclosure can additionally include a computer system for generating contextually relevant verbal responses using user-specific nomenclature. In one aspect, the computer system includes one or more processors and one or more hardware storage devices having stored thereon computer-executable instructions. When executed by the processor(s), the computer-executable instructions cause the computer system to at least: (i) receive an indication of an occurrence of a contextual event, (ii) identify one or more response templates, (iii) identify a modifiable element within the response template, (iv) select, from within a user specific nomenclature, a replacement element, (v) modify the response template by replacing the modifiable element with the replacement element to create a modified response template, and (vi) cause the modified response template to be displayed.

In one aspect, the indication of the occurrence of the contextual event is triggered by a content ingestion system that is coupled to the computer system.

In one aspect, the contextual event includes an event characterized by a textual data stream such that at least one element within the textual data stream denotes a context of the contextual event. In some instances, the contextual event is derived from a non-textual data source, such as a video stream.

In one aspect, the identified response template(s) have a context that matches the contextual event.

In one aspect, the user specific nomenclature comprises a dataset of textual elements associated with a historical use of a particular entity. In some instances, the contextual event is identified as being linked to the particular entity.

In one aspect, the modifiable element is a textual phrase comprising at least two words and the replacement element is a different textual phrase.

In one aspect, the textual phrase and the different textual phrase have different word lengths.

In one aspect, the replacement element and the modifiable element are within a threshold distance of each other on a contextual mapping. In some instances, the contextual mapping includes a plurality of textual elements positioned according to a contextual meaning of each textual element such that textual elements with more similar contextual meanings are positioned closer within the textual map than textual elements with more dissimilar contextual meanings.

Embodiments of the present disclosure include a computer readable hardware storage device having stored thereon computer-executable instructions that are executable by one or more processors of a computing system to cause the computing system to execute a method for generating contextually relevant verbal responses using user-specific nomenclature. The method includes receiving an indication of the occurrence of a contextual event, identifying one or more response templates, identifying a modifiable element within the response template, selecting, from within a user specific nomenclature, a replacement element, modifying the response template by replacing the modifiable element with the replacement element to create a modified response template, and causing the modified response template to be presented at a computer screen.

This summary is provided to introduce a selection of concepts in a simplified form that are further described below in the detailed description. This summary is not intended to identify key features or essential features of the claimed subject matter, nor is it intended to be used as an indication of the scope of the claimed subject matter.

Additional features and advantages of the disclosure will be set forth in the description which follows, and in part will be obvious from the description, or may be learned by the practice of the disclosure. The features and advantages of the disclosure may be realized and obtained by means of the instruments and combinations particularly pointed out in the appended claims. These and other features of the present disclosure will become more fully apparent from the following description and appended claims or may be learned by the practice of the disclosure as set forth hereinafter.

BRIEF DESCRIPTION OF THE DRAWINGS

The patent or application file contains at least one drawing executed in color. Copies of this patent or application publication with color drawing(s) will be provided by the Office upon request and payment of the necessary fee.

In order to describe the manner in which the above recited and other advantages and features of the disclosure can be obtained, a more particular description of the disclosure briefly described above will be rendered by reference to specific embodiments thereof, which are illustrated in the appended drawings. It is appreciated that these drawings depict only typical embodiments of the disclosure and are not therefore to be considered to be limiting of its scope. The disclosure will be described and explained with additional specificity and detail through the use of the accompanying drawings in which:

FIG. 5B illustrates blending textual data streams into blended visual representations according to one or more embodiments of the present disclosure.

FIG. 10 illustrates a user-specific nomenclature for customizing prompts according to one or more embodiments of the present disclosure.

Additional embodiments of the present disclosure are shown and discussed in U.S. Provisional Patent Application Ser. No. 62/861,905, filed Jun. 14, 2019 and titled "INTERACTIVE OBFUSCATION AND INTERROGATORIES," which is incorporated herein by reference and U.S. Provisional Patent Application Ser. No. 62/892,329, filed Aug. 27, 2019 and titled "THREE-DIMENSIONAL MAPPING FOR DATA PROTECTION," which is incorporated herein by reference.

DETAILED DESCRIPTION

Before describing various embodiments of the present disclosure in detail, it is to be understood that this disclosure is not limited to the parameters of the particularly exemplified systems, methods, apparatus, products, processes, and/or kits, which may, of course, vary. Thus, while certain embodiments of the present disclosure will be described in detail, with reference to specific configurations, parameters, components, elements, etc., the descriptions are illustrative and are not to be construed as limiting the scope of the claimed invention. In addition, the terminology used herein is for the purpose of describing the embodiments and is not necessarily intended to limit the scope of the claimed invention.

Furthermore, it is understood that for any given component or embodiment described herein, any of the possible candidates or alternatives listed for that component may generally be used individually or in combination with one another, unless implicitly or explicitly understood or stated otherwise. Additionally, it will be understood that any list of such candidates or alternatives is merely illustrative, not limiting, unless implicitly or explicitly understood or stated otherwise.

Any headings and subheadings used herein are for organizational purposes only and are not meant to be used to limit the scope of the description or the claims.

Overview of Interactive Obfuscation

As previously described, current systems for collecting, analyzing, and interpreting large data may be inefficient, non-secure, or subject to inconsistent end-user analysis. The technology and embodiments described herein improve on existing systems in a number of ways.

Figure 1:
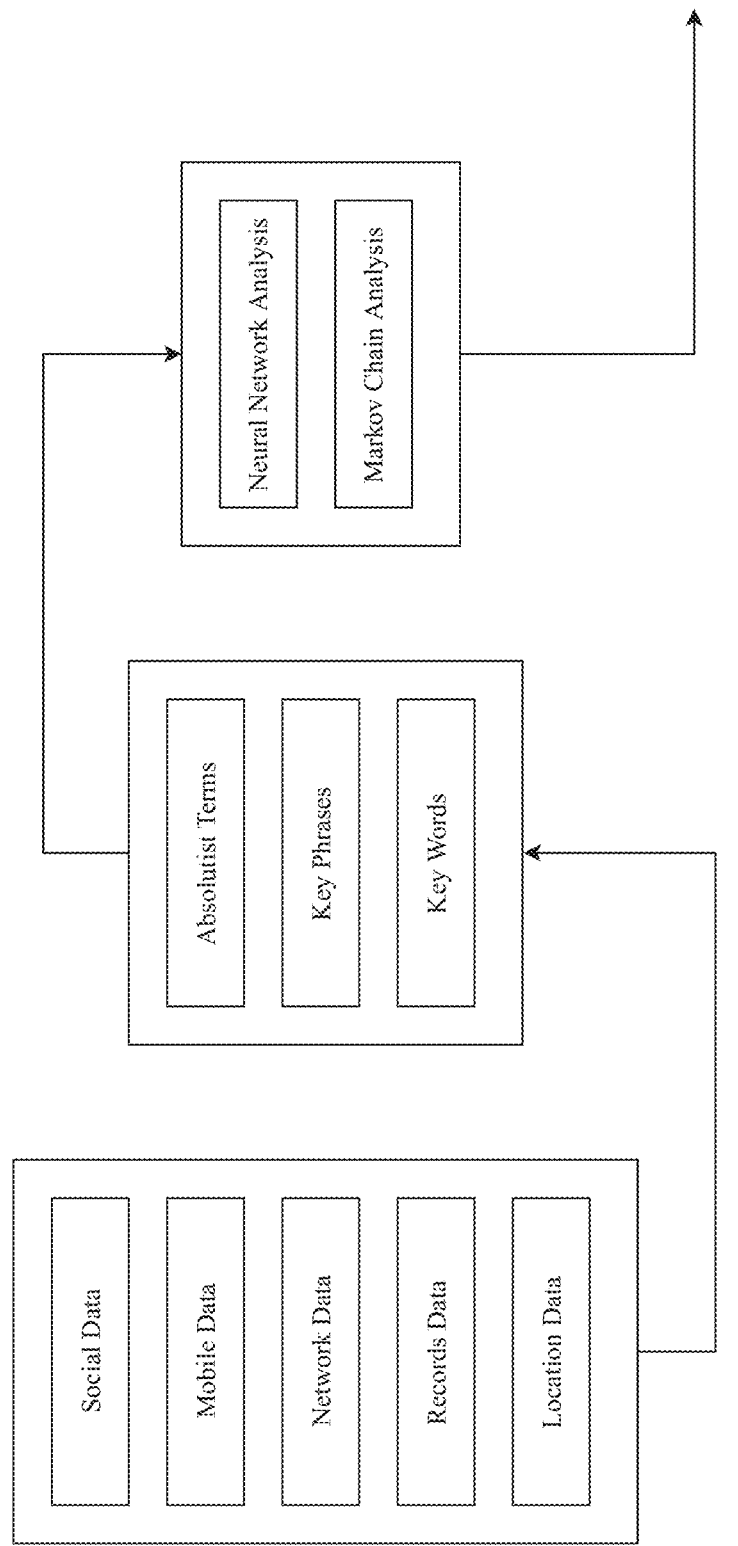
FIG. 1 illustrates one or more sources for ingesting textual data into an obfuscation system according to one or more embodiments of the present disclosure.

In one example, large amounts of information are ingested into a system (see, for example, FIG. 1). This information may come from any type of data stream such as social data, mobile data, video data, audio data, and/or textual data, such as social media posts, location data, or the like. The information may also include network data or records data that is not directly generated by a user as speech or action but that is associated with the user's actions. As that data is ingested, it is "textualized" by having the content of the data described in words. For example, speech recognition may be applied to a video stream to have the words spoken by people in the video turned into textual content. That textual content can then be linked to the person speaking.

In typical big data systems, that raw textual data would then be stored. However, doing so introduces the processing security issues previously described. Thus, the present systems further process the textual data into a form that maintains an underlying contextual meaning of the textual data but without directly retaining the data itself. This allows a form of anonymization or obfuscation of the underlying data to beneficially protect personal data while also reducing the burden of storing large amounts of data. It can further decrease the processing power required for closed loop processing of information from a end user device, allowing the system to more quickly and dynamically identify and respond to global trends and/or trigger events.

In one example, the textual data is first converted into a visual representation by mapping the textual data into a data map that links textual information to a visual identifier such as a specific color. Large color spaces, such as hexadecimal color spaces, can be utilized to ensure that specific words are given precise and unique colors. Further, the color associated with a word may be chosen according to the context of the word within the textual data stream.

In this way, the textual data stream can be partially obfuscated by replacing the exact textual data with visual representations. However, an additional step can also be applied to further secure the data without losing the overall meaning and/or context.

For example, after the initial mapping of the textual data to the visual representation, groups of contextually similar visual representations can be blended together to produce a singular aggregate result. In this way, a single representation can be used to track the overall meaning and/or context of a collection of underlying textual data elements. Additionally, because of the types of blending described herein, the underlying textual data cannot be ascertained from the singular aggregate result. Accordingly, the contextual meaning is retained and can be communicated without revealing the actual textual data elements and making it difficult or improbable for the component parts of the aggregate result to be determined.

This irreversible blending is desirable in many contexts. For example, suppose the underlying textual data is linked to a student at a high school. It may be desirable to understand the emotional state of that student so teachers, counselors, and/or administrators can ensure the health and safety of that student and other students at the school. However, it is not practicable or desirable to merely produce a stream of textual data about the student for review by those interested parties. Not only would doing so overwhelm them (e.g., due to the sheer number of students and the rapidly changing emotional states of these individuals), but the privacy of the student would be reduced, and there would be significant likelihood that any of the individual parties might inconsistently interpret the meaning behind the underlying data.

Thus, instead of presenting raw underlying data, the described systems may present to someone, like a counselor or pre-selected individual, a singular visual representation of a particular context relating to the student (or other person), particularly a student in need of (or that could benefit from) a meaningful interaction. For example, a representation of the emotional state of the student over the prior 12-24 hours could be useful. Armed with this contextual information, the counselor will have a greater understanding of the state of the student but will interact with the student in a broader manner because the interaction is not clouded by the precise content of the underlying data.

Notably, however, because the context of the textual data can be mapped according to severity, scale, etc., it is still possible for the counselor to recognize particularly notable contextual states of the student even if they don't know the precise underlying content that is represented in the visual representation.

It is also an objective of the present invention to improve the manner and type of interventions or interactions that are generated as the result of identifying a current contextual state of a user that warrants an intervention.

Using the high school student again as an example, a counselor may be prompted using a visual representation that the student is currently in an emotional state that may benefit from an interaction. Presented with the color information, the counselor may know enough to ask the student how they are feeling or to otherwise provide an interaction that is more likely to be well received by the student and/or to meaningfully affect the student (e.g., by potentially diffusing events that could lead to self-harm or harm to others). However, an improved question may be possible through linking predetermined queries to the contextual meaning of the current contextual state the student is in (i.e., the emotional state presented in the form of a color).

In this way, a specific prompt can be given to the counselor to ask the student that is derived or otherwise linked specifically to the state of the student at that time.

In addition to providing specific prompts to the user based on the subject's state, the prompts themselves can be customized using subject-specific information such as a subject-specific nomenclature database. For instance, as the original textual data for the subject is being ingested, a separate database of common words or phrases used by the subject can be collected. Notably, this nomenclature database may be specifically scrubbed of interrelationships among the words such that one cannot derive the original textual data. Instead, the database can be used as a way to customize predetermined prompts to replace words from templated prompts with the words known to be used by the subject. In this way, a more relatable prompt can be generated and the interaction between, for example, the counselor and the student can be improved.

Notably, in order to further secure the nomenclature database, a particular type of user specific obfuscation may be employed. For example, a biometric identifier may be created for the user associated with the nomenclature database. As textual data is placed into the database, it may be processed in the manner previously described to modify the representation of the textual data into a visual representation. The biometric identifier (or other specific key) may then be used to cypher or otherwise obscure the individual visual representations such that the user's nomenclature database is unique and can only be accessed with the user-specific key.

Various embodiments of the foregoing are discussed in further detail below.

Figure 2A:
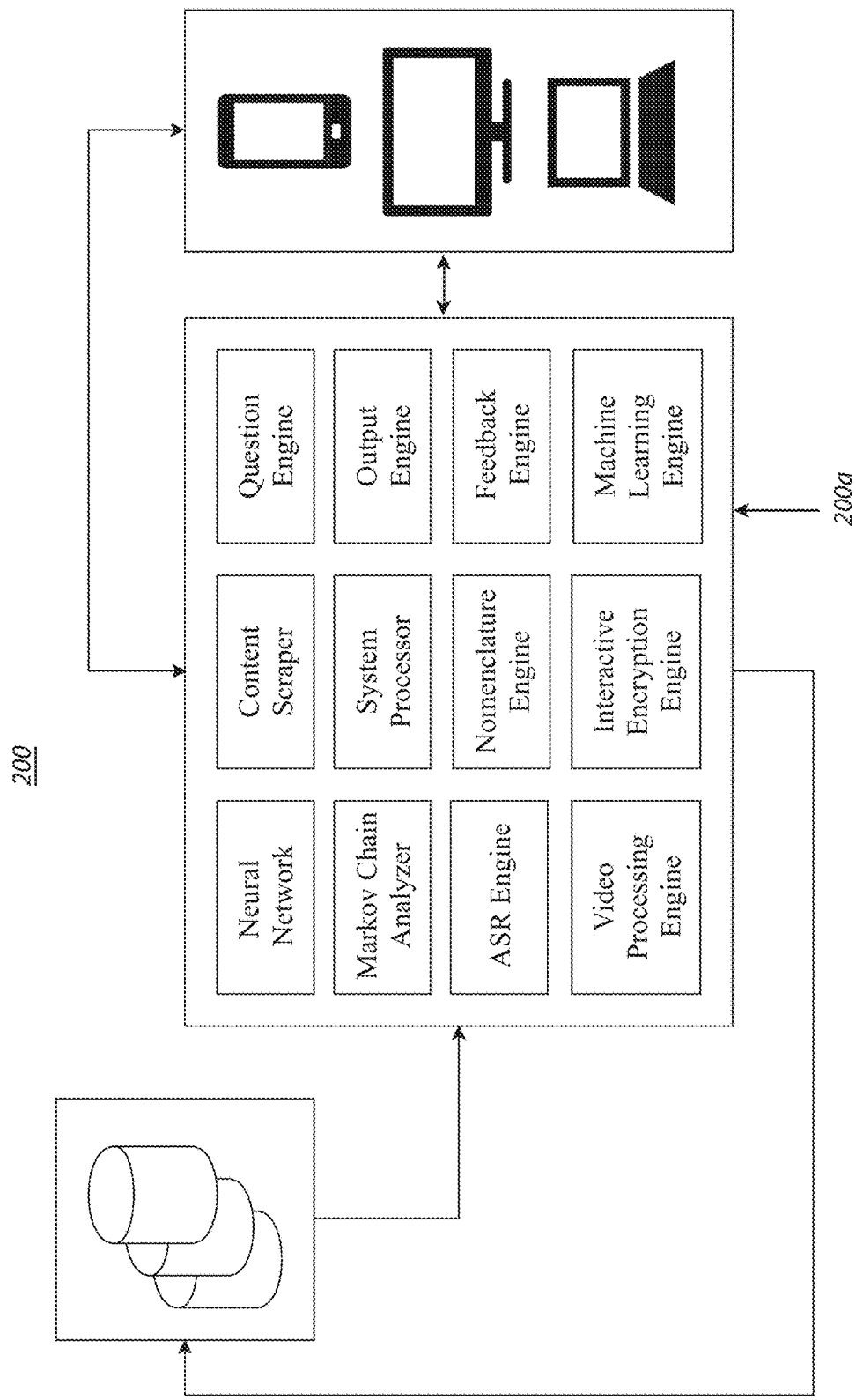
FIG. 2A illustrates a system for ingesting data streams to produce contextualized responses according to one or more embodiments of the present disclosure.

Overview of Various Disclosed Systems and Methods for Contextual Encryption, Multi-Dimensional Obfuscation, and Generating Contextually Relevant Verbal Responses FIG. 2A illustrates an exemplary system that is capable of performing the functions that will be described herein. As illustrated, system 200 includes a number of operating components including a neural network, Markov chain analyzer, automated speech recognition (ASR) engine, video processing engine (VPE), content scraper, system processor, nomenclature engine, interactive encryption engine, question engine, output engine, feedback engine, and/or machine learning engine.

As further illustrated, system 200 may be coupled to a database 210 comprising one or more distributed storage elements. Notably, database 210 is illustrated as providing a single connection to system 200, however it is appreciated that database 210 may include numerous different databases, connection, locations, database types, etc., depending on the configuration of system 200.

It is also contemplated that the elements within system 200 may independently establish connections to the same or different databased from within databases 210. For example, the neural network may establish a connection to a particular database within database 210 while the ASR engine establishes a connection with a different database within database 210.

It is also appreciated that in some circumstances controlling hardware or software elements within system 200 may mediate or otherwise facilitate the connections among the various components and elements within database 210.

The connections between system 200 (or its components) with the entities within database 210 (as previously described) may be accomplished through different connection means and may include a variety of connection types. For example, the system processor may connect to a database 210 component through a direct local connection while video processing engine may connect to database 210 through a network connection that is mediated by network hardware or another system. While these are only examples of potential links, it is recognized that system 200 may be configured to allow databases to be configured in different arrangements based on processing needs, storage requirements, security regions, or other storage considerations.

FIG. 2A also illustrates that system 200 may also be connected to or accessible by various endpoint elements such as mobile devices, end-user computing resources, or desktop computing systems. It should be appreciated that such is likely to be provided over a computing network such as the Internet although the manner in which data may be shared from system 200 to the connected endpoint devices may vary based on configuration. For example, some devices that can access highly sensitive information through system 200 may be required to share a local connection with system 200 rather than being operate over the Internet.

Further, the end-user computing resources can be linked with the database 210 (or components of the database 210 or system 200) to thereby enable closed-loop processing of end-user data received or generated at the end-user device. For example, global trends or triggering events can be identified and/or tracked via a closed-loop interaction between the end-user computing resource and the database. The database may include a larger set of peripheral data surrounding or associated with the user, and those data can be processed, for example, by a machine learning engine to identify a current or global (e.g., over time) state of the user. These data can be continually updated and can also be informed by closed-loop processing of user-derived interactions and data received directly from the end-user computing resource. In a non-limiting example of the foregoing, an end-user may send a text message or email, which is captured by the system, processed within the database, and optionally obfuscated for storage or incorporation into a global trend of the end-user state. The same data can additionally be used to identify a "present" user state through processing at the database (or components associated with the database). In some instances, the present user state can be monitored, and if the present user state is associated with a triggering element or exceeds a predefined threshold, the system can dynamically respond to provide early intervention for acute and/or catastrophic events (as opposed to exceeding a low threshold of the longitudinal/global trend, for example).

Figure 2B:
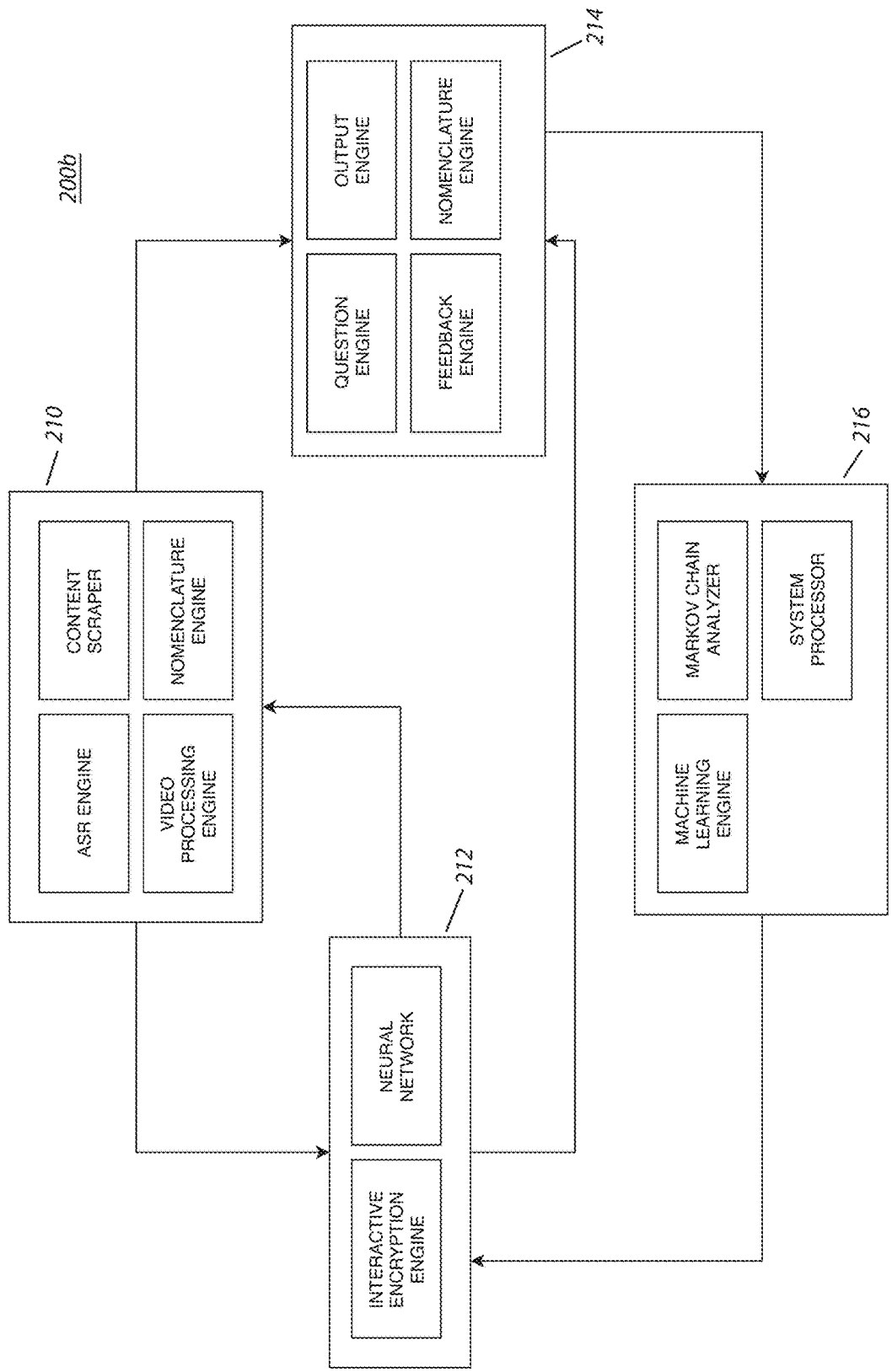
FIG. 2B illustrates a system flow diagram for ingesting data streams to produce contextualized responses according to one or more embodiments of the present disclosure.

FIG. 2B illustrates the elements of system 200 from FIG. 2A, but according to more specific exemplary groupings. In the example of FIG. 2A, the components of system 200a are divided into four logical or systematic groupings. As illustrated, these groupings include an ingestion system 210, a processing and storage system 212, a utilization and presentation system 214, and supporting infrastructure 216.

As can be appreciated by comparing system 200a to system 200 from FIG. 2A, the elements within system 200a are the same elements from system 200. However, in order to better convey some aspects, grouping the elements into these sub groups may be beneficial.

Within the ingestion system 210, elements that allow external content to be introduced into the system are included. For example, the content scraper may be utilized to search identified content sources for content types that can be ingested. Once the content has been identified, the content scraper can directly ingest the content if it is textually based or may direct a different content processor to handle the task. For example, if the identified content is audio, the ASR engine may utilize the information from the content scraper to identify and ingest the audio data. Similarly, if the data is video based, the video processing engine may perform the tasks necessary to ingest the information into the broader system 200a.

In some instances, the content is a mix of media types. For example, a website may contain a mix of textual information, video information, static image information, or other types or sources of information. In these situations, the ingestion system may utilize one or more of the components in order to handle the different types of content. For example, the video processing engine may be relied on to handle video content within the website, while the content scraper may utilize textual interpretive tools in order to parse the text that on the website.

The ingestion system 210 also includes a nomenclature engine. The nomenclature engine will be described in much greater detail later in this description, but it is appreciated that the nomenclature engine functions in conjunction with the content scraper the ASR engine video processing engine and perhaps other elements within the ingestion system in order to extract portions of language from the processed data from those other elements. These extracted portions of language can then be used to generate a customized nomenclature that is tied to the source of the content. As an example, textual data that is ingested by the content scraper and that is identified as being linked to a particular subject, can be used to generate a nomenclature using the nomenclature engine that is associated with the particular subject.

System 200a also includes the processing and storage system 212. As illustrated, the processing and storage system includes an interactive encryption engine and a neural network. It is also appreciated that the processing and storage system is communicatively connected to the ingestion system such that information originating from the ingestion system may be provided to the processing of storage system, and information that is generated at the processing and storage system may be shared back to the ingestion system. It is also appreciated that certain information may only flow in one direction or the other between the ingestion system and the processing and storage system. It is also appreciated the connection between the ingestion system and the processing and storage system may be a local connection, or maybe mediated over a network such as the Internet.

System 200a also includes the utilization and presentation system 214. The system includes a question engine component, a feedback engine component, and output engine components, and the nomenclature engine. It is also appreciated that the utilization and presentation system 214 is communicatively connected to the processing and storage system and to the ingestion system as will be described later.

The utilization and presentation system 214 is designed to take the information from the processing and storage system 212 and the ingestion system 210 and presented to an end user according to the processes that will be described later in conjunction with the other two systems. It is also appreciated the utilization and presentation system 214 could be used to receive feedback or other input from the user in order to alter or reconfigure the way in which the ingestion system 210 and/or the processing and storage system 212 functions.

As is appreciated, the utilization and presentation system 214 includes a nomenclature engine that may be different from the nomenclature engine included within the ingestion system 210. In some embodiments, the same underlying componentry or logic may be used for both nomenclature engines, but the ingestion system may utilize one configuration of that engine while the utilization and presentation system utilizes a different version of the nomenclature engine.

FIG. 2B also illustrates a supporting infrastructure 216 that includes a machine learning engine, a MARKOV chain analyzer, and one or more system processors. These elements are completely connected to each of the ingestion system 210, the processing and storage system 212, and the utilization and presentation system 214. These elements are meant to denote the concept that some elements of system 200 a may be shared among all of the various subcomponents in order to allow those components to individually function and to function together as a complete system.

Figure 3:
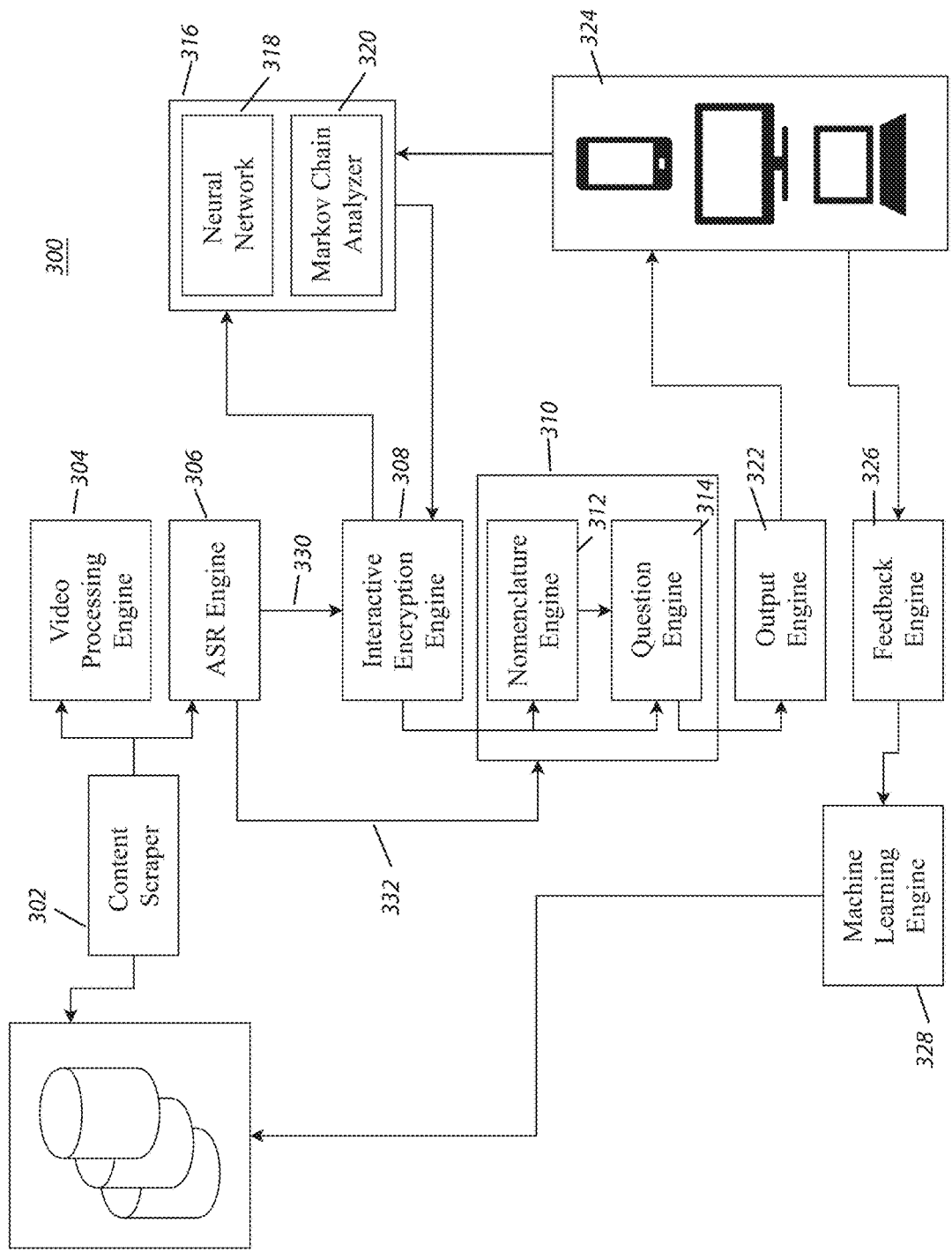
FIG. 3 illustrates an alternative system flow diagram for ingesting data streams to produce contextualized responses according to one or more embodiments of the present disclosure.

In FIG. 3, a logical flow chart of the elements illustrated in FIG. 2A and FIG. 2B is depicted. It is appreciated that this is one potential logical flow in which content may be ingested into the system process through an interactive encrypted system and then provided to the utilization and presentation system, including at user output devices such as a mobile device, desktop computer, or the like.

The content ingestion system may obtain information from one or more datasets or databases. That information may then be provided to one or more information processing components such as the video processing engine 304, and/or the ASR engine 306. In the case of the video processing engine 304, video data is provided. The video processing engine 304 is configured to recognize the contents within the provided video stream. This recognized content is then translated into textual data. For example, if video was provided of two individuals speaking to each other, video processing engine may perform one or more of the following identifications.

First, the video processing engine 304 may be configured to identify the identities of the speakers and may do so through one or more means. In one example, the video processing engine 304 has the ability to utilize biometric markers such as facial recognition in order to identify human individuals within a video stream. Once the identification of the identities of the subjects within the video has been performed, the video processing engine may convert that information into textual data. This can be provided as a data stream to another component within the illustrated system 300.

Video processing engine 304 may perform other similar types of identification. For example, video processing engine 304 may be configured to recognize certain behaviors or actions or elements within a video stream. For example, the video processing engine 304 may be configured to identify the presence of certain elements, such as weapons, within a video stream. In such a configuration, the video processing engine, upon recognizing a particular element that it is trained to recognize is present with in the video stream, may add textual data regarding that element to the data stream that it is provided to other elements within the system 300.

The video processing engine 304 may also identify other sorts of information, based on machine learning or data training datasets. For example, video processing engine 304 may be configured to recognize behaviors, locations, or other contextual information that is occurring within the video stream. As with the particular people and/or objects that can be identified, this contextual data may be provided in the data stream from the video processing engine that is provided to the other components within the system.

The ASR engine 306, may be configured to perform similar operations as the video processing engine 304, but upon audio information specifically rather than video information. It is appreciated that the video processing engine 304 and the ASR engine 306 may function in tandem in the case of video data. So for example, the video processing engine 304 may be configured to identify the visual elements within a video stream, such as those previously described, while the ASR engine 306 is configured to extract speech or other types of audio information from the video stream. As with the video processing engine 304, the ASR engine 306 is configured to recognize and translate the audio information into textual data. Accordingly, the primary purpose of the video processing engine 304 and the ASR engine 306 is to generate textual data that can be utilized and analyzed by other elements within the system.

This textual data stream produced by the ingestion system includes information that is not only purely descriptive of the contents (e.g., user identities, words that are spoken, text that is written, or other similar elements), but also includes contextual information surrounding the ingested content. This contextual information may include information such as derived location, timestamp information, data source information, or other similar contextual metadata.

The ingestion system may be further configured to link the contextual data to the actual contents that are identified during ingestion.

As is illustrated in FIG. 3, once data has exited the ingestion system, it may be passed to one or more of the other elements in either or both of the processing and storage system or the utilization and presentation system. For example, FIG. 3 illustrates that the output from the ASR engine, may be provided directly to the interactive encryption engine 308, and/or to the utilization and presentation system 310 exemplified by the nomenclature engine 312 and the question engine 314.

In some instances, the ASR engine 306 may provide the same information to these two separate locations or it may provide separate information to each of the two different locations. For example, the ASR engine 306 may provide the entirety of the process data streams to the interactive encrypted engine 308, while it may only provide the directly interpreted textual data to the nomenclature engine 312.

Referring now to the interactive encryption engine 308 component, upon receiving the configured textual data from the ingestion system, the interactive encryption engine 308 may process the textual data using one or more processing components, such as a neural network 318.

As understood by one having skill in the relevant art, a neural network is a particular configuration of computing nodes that have been configured for the purpose of identifying deep relationships among datasets. Further, the neural network is capable of processing large datasets rapidly and can be dynamically extended to provide necessary processing bandwidth for enormous datasets.

Interactive encryption engine 308 may also make use of a Markov chain analyzer 320. A Markov chain analyzer 320 is configured to rapidly assess a particular dataset and identify a current condition within the dataset as the dataset is modified. For example, as the interactive encryption engine 308 provides the received information from the ingestion system to the neural network 318 (or other machine learning model) within the machine learning and computation module 316. The Markov chain analyzer 320 of the module 316 may be configured to identify when a particular condition occurs within the process information, and then provide a notification back to the interactive encryption engine 308 that the condition has been met.

In another configuration, the Markov chain analyzer may be configured to track the instantaneous change in conditions for sub elements within the process dataset and/or as received from a closed-loop processing event between the end-user computing resource 324 and one or more components of the machine learning and computational module 316, such as the Markov chain analyzer 320 and/or neural network module 316. For example, the data received from the end-user device 324 can be pushed to and analyzed by the machine learning and computational module 316 and/or nomenclature engine 310 to more dynamically and in some instances more quickly identify acute triggering events or update global trends in the user state. Such an exemplary closed-loop processing event can beneficially enable instances of alarm/triggering events that exceed a current threshold value and thereby allow early intervention of catastrophic events.

It should be appreciated that the end-user computing resource can represent a community of devices, which together can provide a current or global trend of a community. In an exemplary embodiment, each device within a community of devices can be associated with a hexadecimal code (or color) associated with the current user state associated with the respective device. When viewed holistically, a heat map can be observed, which can beneficially enable a user to quickly identify possible communities and/or community areas that could benefit from intervention.

It should additionally be appreciated that the temporal nature of embodiments can be mutable in some embodiments. A "current" event can be associated with data that is, for example, less than a month old, less than a week old, less than a few days or one day old, within the current day, less than a few hours old, or less than minutes old. Similarly, "longterm" or "global" data can be tracked over varying periods of time, including, for example, a number of years, months, weeks, or days. In some instances, the temporal nature of current/longterm events is locked or preset. In other instances, it can be changed automatically or manually based on circumstance or desired sensitivity of the system. For example, the observed time can be dynamically windowed (e.g., events timestamped within the past 4 hours, events between 30 minutes and 8 hours old, events between 1 and 3 days old, events within the past three days, etc.). This can beneficially enable the system to modulate its sensitivity to data associated with the user and/or enable more timely interventions to catastrophic events and/or to prevent catastrophic events.

As an additional example, as the neural network processes data information received from the content ingestion system, the neural network may be configured to identify in real time the identity of the source of a particular element of data. Once the source of the data has been identified, the Markov chain analyzer may be configured to provide an instantaneous analysis of one or more conditions related to the source of that data. For example, if the first person has been identified as being the source of the textual data being processed by the neural network and the Markov chain analyzer has been configured to identify one or more preset conditions, when the textual data associated with the user is identified as representing one or more of those conditions when processed by the neural network, the Markov chain analyzer may produce an indication that is transmitted back to the interactive encryption engine that indicates that the particular condition has been met for the identified user. This specific element of data that causes the condition to be triggered may also be linked with the notification that the condition has been met.

A Markov chain analyzer may be particularly beneficial when used in conjunction with a long-term machine learning system. For example, machine learning may be utilized to generate a long-term recognition or understanding of a particular data source, or a particular user associated with the data source. Stated another way, the machine learning algorithm may generate a deeper understanding of the content or content source as more information is received and processed over time.

However, with machine learning, some interesting data elements that are occurring in real time may be underrecognized as important because they are, in effect, merged into a larger dataset. Because of this, a Markov chain analyzer may be utilized to track the instantaneous condition of the dataset regardless of historical information associated with the dataset. As such, a Markov chain analyzer may be utilized in conjunction with the machine learning algorithms to identify both historical long-term information about a user or a dataset while also identifying instantaneous information about the dataset.

Alternatively, or in addition, the textual output from video processing engine 304 and ASR engine 306 may be provided to nomenclature engine 312 and/or the question engine 314, identified collectively by callout 310. As illustrated, information can be provided over connection 332. As has been previously mentioned, the connection between the ingestion system and other systems, such as the system that includes nomenclature components 310, may be local or network mediated. Thus, connection 332 may comprise a direct connection between the two systems or may represent the network connection over a public switched network such as the Internet.

Nomenclature components 310 may receive some or all of the information from the ingestion components. In one exemplary embodiment, nomenclature components 310 receive only a stream of textual data that is directly derived from the ingested content. For example, exact speech spoken by subjects within video information, speech derived through processing audio data, or text that has been ingested.

Within the nomenclature components 310 there is a nomenclature engine 312. Nomenclature engine 312 accepts raw textual data and generates a nomenclature dataset (not shown) that is linked to one more subjects.

Such a nomenclature dataset may include a real listing of all of the understood words from within the data stream. However, the nomenclature dataset specifically does not maintain a relationship between the words within the dataset. Instead, the nomenclature dataset is merely a dictionary or other data structure that can be used to track the words, and/or language elements, that are tied to a particular subject. In this way, the actual words used by the subjects can be tracked and stored without having to maintain their context. Storing the data in this manner is significantly less resource intensive. It also provides some privacy benefits to the user because the random listing of words is less sensitive than a database that contains the complete, readily cognizable usage context for a particular user.

Once the nomenclature engine has received and cataloged the language elements from the ingestion system, the nomenclature engine 312 can pass or otherwise provide access to the dataset to question engine 314. Question engine 314, as will be described later, can take the raw nomenclature datasets and make use of them in a manner that can be provided to the output engine 322. For example, question engine 314 may provide questions to the output engine 322 that have been formulated using the nomenclature dataset for a particular user. Output engine 322 may then cause one or more questions or user prompts to be generated that are displayed at a user device 324.

In one example, question engine 314 may generate a question that can be asked by a user of a device 324 to the data subject associated with the nomenclature dataset generated by nomenclature engine 312, which is associated with a particular user linked to the content ingested by the ingestion system.

The question generated by question engine 314 can then be presented at device 324. Upon presenting the question, the user device 324 may provide feedback that is processed by feedback engine 326. For example, the user may provide feedback that includes an indication that the particular question provided by question engine 314 and output by output engine 322 resulted in a particular result, for example, met a desired goal or produced the desired response.

Feedback engine 326 can then provide that result to machine learning engine 328. Machine learning engine 328 may be linked to question engine 314 such that machine learning engine 328 is able to discern the purpose that was desired for the particular question generated by question engine 314. Machine learning engine 328 can then compare the feedback received from feedback engine 326 with the original desired outputs associated with the generated question. Machine learning engine 328 may then provide new information back into the system as a whole regarding the effectiveness of the particular question. In this manner, the system may be tuned to improve the way the questions are generated and/or selected.

In one example, the user device 324 may provide to feedback engine 326 results that the question seemed inappropriate or out of context for the user. Machine learning engine 328 may take that feedback and provide it to the ingestion system when it is determined that the initial ingestion of the content for the user may be incorrect.

For example, user of device 324 may provide feedback that indicates that a particular scale of the question appears to be incorrect. In this scenario, machine learning engine 328 may provide feedback to interactive encryption engine 308 to better categorize the raw data received from the ingestion system, as will be described in greater detail below.

Various Exemplary Embodiments of Systems and Methods for Encrypting Data while Retaining Contextual Meaning Turning now to FIG. 4, a broad concept will be described in and applied within the previously described system in conjunction with FIG. 5.

Figure 4:
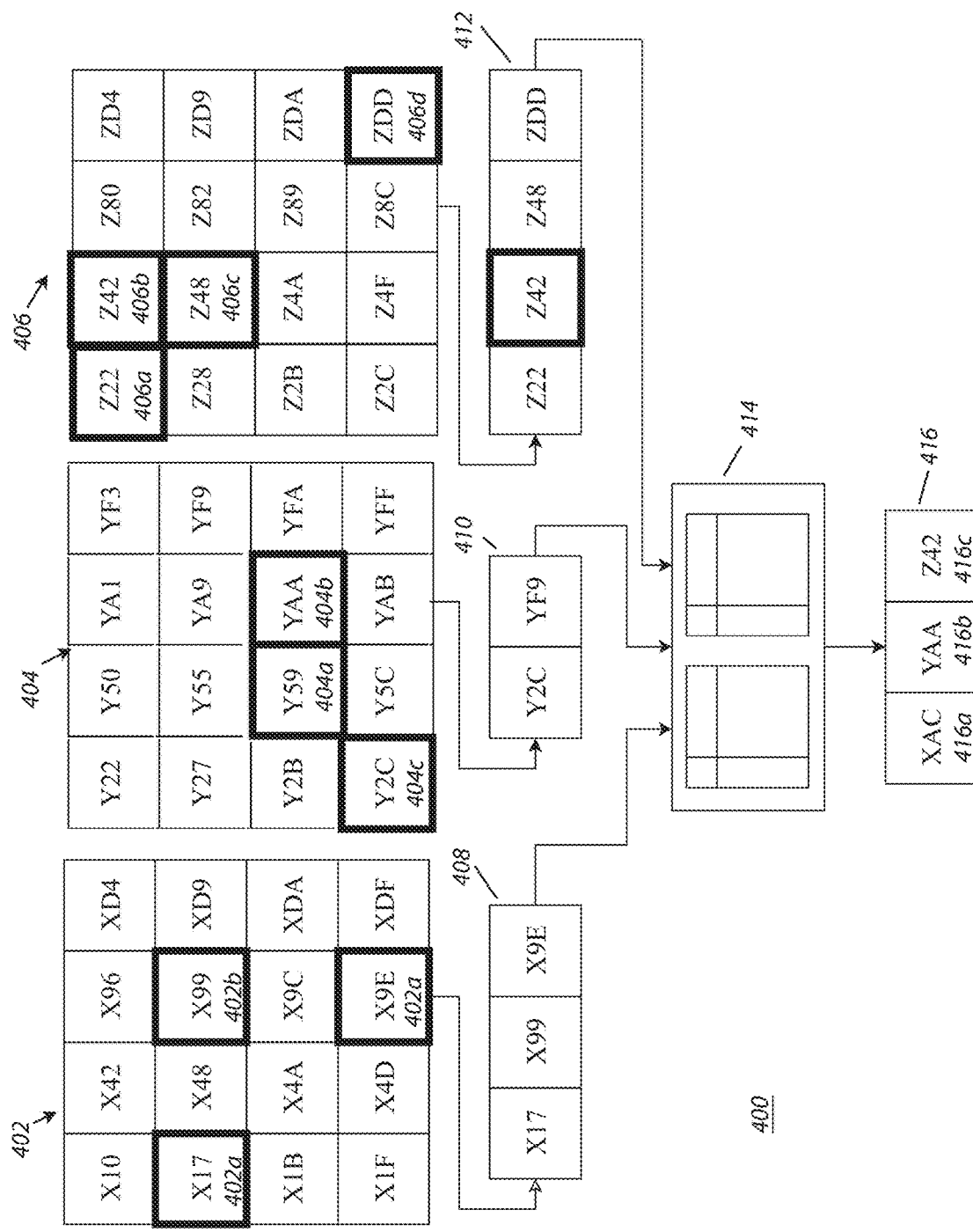
FIG. 4 illustrates processing textual data streams into visual representations according to one or more embodiments of the present disclosure.

FIG. 4 illustrates an embodiment for categorizing and merging the meaning and context of raw data received from a system such as the previously described ingestion system. As illustrated, three representative data element categories are shown, data element category 402, data element category 404, and data element category 406 are illustrated.

As illustrated, each data category is shown with a series of boxes that include a unique identifier code. For example, data category 402 includes box 402a associated with code "X17," box 402b includes the identifier code "X99," and box 402c includes the identifier "X9E." Similarly, within element category 404, box 404a includes the identifier "Y59," box 404b includes the identifier "YAA," and box 404c includes the identifier "Y2C." Data category element 406 includes element 406a identifying code and "Z22," element 406b identifying code and the "Z42," element 406c identifying code to "Z48," and element 406d identifying code as "ZDD."

It is further appreciated that each of the codes within the particular data categories may be linked to a word or phrase that is contextually relevant within the data category. For example, data code 402a may be associated with a particular word—and that particular word is then represented within the data category by the identifier code.

In one example, data category 402 may represent words or phrases that are categorically related to a concept such as emotions. Data category 404 may represent words or phrases that are related to a concept such as actions. Data category 406 may represent words or phrases that are related to a concept such as geographic locations. In another embodiment, each of data category 402, 404, and 406 are linked to a different context within a similar or related category. For example, category 402 may be linked to words or phrases related to anxiety, category 404 to depression, and category 406 to optimism.

As can be appreciated, any number of different data categories or sub-categories can be imagined and those included within this description are to be understood only as examples.

Such sub-categories may also be grouped according to important types of textual elements. For example, "absolute" terms include terms that have strong links to specific actions actually occurring. In other words, when certain words are used, there is a high likelihood that a particular type of action will accompany or result from those words. Certain words are associated with actions such as self-harm or harm to others, for example. As such, absolutist terms may be grouped together within a sub-category, or they may be otherwise designated such that their particular context as being particularly linked to an action is maintained.

It is further appreciated that other types of key words or key phrases can also be grouped together or placed within a broader grouping such that their context is propagated through the various stages of obfuscation and their effect present in any final visual representation.

In the embodiment illustrated in FIG. 4, it will be assumed that when data is received and ingested, it is converted into a textual data stream, as previously described. Each of the elements with the textual data stream may then be sorted according to a context associated with the particular element. Depending on the embodiment, the textual elements may be single words, or multiple word phrases, or a combination of single words and multiple word phrases.

The textual element may then be matched to an element within data category 402, 404, or 406. In so doing, the context of the textual element may be identified by ascertaining the contextual identifier associated with the data category to which the textual element has matched. In other words, if the textual element matches an element within a particular data category, that textual element has a context that matches that category. In some instances, a particular textual element may match entries within multiple data categories such that the textual element may have multiple contexts.

As one example, suppose a particular element within a textual data stream includes the single word "hurt." The word "hurt" may match into a data category associated with "actions" because "hurt" may be identified as describing the verb "hurt." Additionally, the word may match into a data category associated with "negative feelings" because "hurt" may be identified as being indicative of an emotional state.

In another example, a complete word phrase may be utilized in conjunction with or instead of the single word phrase. For example, perhaps the larger word phrase from the example above included "I will hurt." In this example, the word phrase may be mapped into the same "actions" data category above, but may not be mapped into the "negative feelings" category because the "negative feelings" category does not include an entry for "I will hurt" but instead may only include an entry for "I am hurt."

It is appreciated, therefore, that a single word may be mapped into more contextual data categories than a larger word phrase containing the single word.

It is also appreciated that the particular data categories may include entries that are ranked or otherwise internally organized such that their position within the data category is indicative of an internal context. For example, the elements within data category 402 may be organized such that an element in the upper left corner "X10" has a weaker contextual link to the data category than the element in the bottom right corner "XDF" has.

In another embodiment, the arrangement of the elements within the data category may represent a scale such that as elements move from one end of the scale to the other, there relative position within the data category likewise changes. For example, suppose data category 402 was associated with a context of "threat language." In one embodiment, element 402a may be associated with a data element that is considered to be a lower threat than a data element associated with element 402c. Similarly, element 402b may be associated with a data element that is somewhere between 402a and 402c with regard to the degree of threat. As an example, element 402a may map to the textual phrase "I need to do something" while element 402b is mapped to the textual phrase "I'm going to do something" while element 402c is mapped to the textual phrase of "I have no other choice." While these are just one example, these examples show how the context of different types of similar phrases can be laid out on a spectrum and then assigned a value according to their position on the spectrum.

Thus, continuing the example illustrated in FIG. 4, a textual data stream may be parsed into textual elements (e.g., words or word phrases), that are then mapped and sorted into contextual categories such as category 402, 404, and 406. The particular textual elements are then identified within the category by a data element such as those elements shown within the highlighted boxes within each contextual category. For example, the textual data stream in FIG. 4 results is mapping ten data elements within the three contextual categories including three within category 402, three within category 404, and four with category 406. After sorting the textual elements into the categories, those textual elements can be represented by the data elements 408, 410, and 412. In this way, large streams of textual data can be reduced into smaller referential representations that may be easier to process downstream.

Another benefit of converting the raw textual data to intermediate representations is the ability to partially hide the underlying textual data. This may be a benefit for privacy of the person to whom the textual data is associated. Such security may be increased by separating the storage of the intermediate representations from the system that includes the textual map. It may also be beneficial to configure the system such that converting from textual data to the intermediate representation requires a lower security or access level than does the procedure to reverse the information from an intermediate representation back to a textual element.

In some embodiments, once the textual data has been converted to an intermediate representation, the underlying textual data stream can be eliminated. In some embodiments, the ingested textual data is never maintained in a persistent storage device but, rather, is merely converted on the fly and removed from processing memory once the conversion has occurred.

In some embodiments, even an exact one to one relationship between the original textual data and the intermediate representation is not required or necessary. Instead, it may be desirable to further obscure the underlying textual data and retain only the contextual information of the underlying data.

Returning now to FIG. 4, one embodiment of this second stage of obfuscation is illustrated. The data element sets 408, 410, and 412 may be further processed through blending tables 414. The results of such a blending process is output 416. Accordingly, the original ingested textual data may be sorted into categories 402, 404, and 406, consolidated into datasets 408, 410, and 412, and then blended to produce blended set 416. In so doing, the underlying textual data is eliminated but the context of the entire data stream remains represented in the final blended set 416.

Figure 5A:
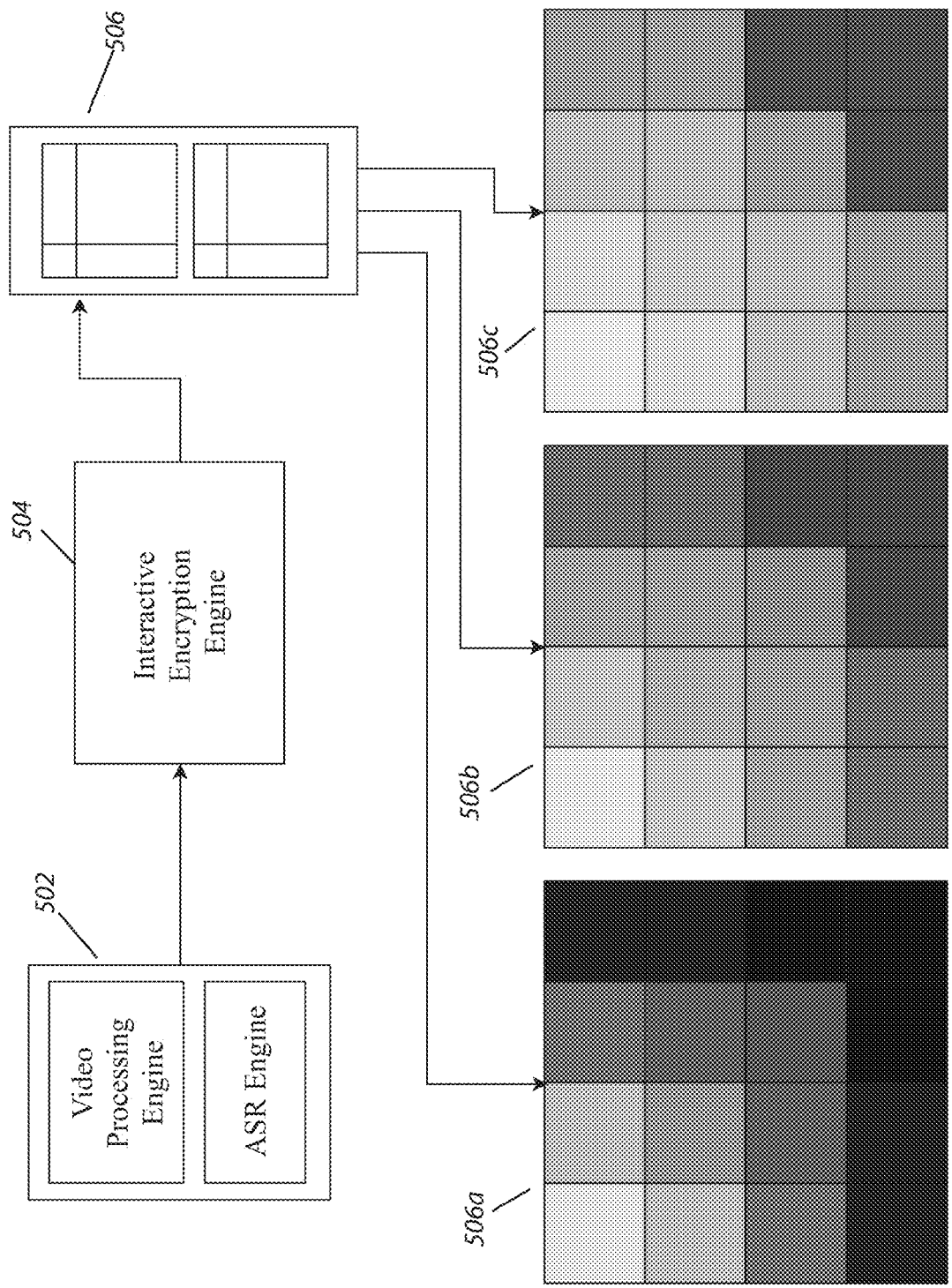
FIG. 5A illustrates processing textual data streams into colorized visual representations according to one or more embodiments of the present disclosure.

To further illustrate the blending capability, FIGS. 5A and 5B illustrate a similar system to that shown in FIG. 4 except the alpha-numeric data elements in FIG. 4 have been replaced by colorized representations. For example, data category 506a, in one embodiment, may be configured to represent the same information as data category 402 from FIG. 4. Likewise, data category 506b and 506c may represent the same information as data category 404 and 406, respectively.

As illustrated in FIG. 5A, data may be ingested through ingestion system 502. Once ingested, the textual data stream is provided to an interactive encryption engine (IEE) 504. Within that engine, numerous rules may be applied to the textual data as represented by the data structures 506. As previously described, textual mapping tables may be one such set of rules. For example, the IEE may include data category 506*a*, 506*b*, and 506*c* among many others.

Based on rules such as those previously described, textual data may be sorted and mapped into the various data categories. Depending on the particular textual data, one or more of the data categories may have a match. In the present example, the resulting matches from each of the data categories 506*a*, 506*b*, and 506*c* are illustrated in FIG. 5B as elements 508A, 508B, and 508C, respectively.

In other words, according to the present example, three textual elements 508*a* matched into data category 506*a*, two elements 508*b* matched into data category 506*b*, and four elements 508*c* matched into data category 506*c*.

IEE 504 may also include a second set of obfuscation capabilities represented by the data entities 510. In the case of data entities 510, the consolidated contextual mappings may be further combined to produce final dataset 512.

In some embodiments, the individual values from each intermediate dataset may be blended together in different ways to arrive at final dataset 512. In one example, each of the elements within dataset 508*a* are averaged together to arrive at element 512*a*, each element within 508*b* are averaged together to arrive at element 512*b*, and each element from within 508*c* is averaged to arrive at element 512*c*.

In other embodiments, different aggregating functions may be utilized. For example, the input data elements may be summed, subtracted, or weighted according to a heuristic. Machine learning may be applied over time to provide different degrees of importance to particular data element values such that they are aggregated in different ways.

It is appreciated that the resultant dataset 512 can then represent the combined context of the underlying data without directly including the underlying data. Further, the exact input data cannot be derived in reverse from the resultant dataset 512 even if the precise blending algorithm is known. For example, if four input elements are received and valued at 1, 4, 9, and 2, respectively, an unweighted average would produce a resultant data element of "4" (i.e., the average of the four values). However, knowing the value of "4" one cannot somehow reverse average and arrive at the original four inputs. This represents a privacy benefit.

It is also appreciated that the blending algorithm may be configured to be as simple or complex as necessary in order to retain the necessary contextual representation of the textual data while eliminating the underlying data itself.

Accordingly, the information mapped within FIG. 5B into the data categories can be represented as a color rather than an explicit code. However, it is appreciated that color is represented on a computer system using some sort of data representation. In one example, color can be coded for on a computer system using hexadecimal codes, or "hex codes." In a hex code-based color system, six alphanumeric characters are used to represent each color. Further, in known hex code systems, a base 16 set is utilized at each of the six positions.

For example, each position may be a character ranging from zero to six or from "A" through "F." In some embodiments, the each of the primary colors (red, green, and blue) may be represented within the six positions in a tuple. For example, in a hex code of "112233" the variation of red is represented by "11" the variation of blue is represented by "22" and the variation of green is represented by "33."

It is appreciated that a base-16 tuple allows for 256 variations of each pure color (16×16) ranging from "00" to "FF." Further, when blending colors, about 16.77 million color variations are possible (256×256×256).

Within the English language, there are around 175,000 total words with fewer than 5000 words covering around 95% of total language use. Thus, it can be appreciated that a hex code set allowing for 16.7 million different colors can easily represent a vast dictionary of English language usage.

Returning then to FIG. 5B, upon ingesting textual data, each of the identified data elements may be mapped within a textual map to a specific color value. As previously described, the color value may represent the context of the textual element within a particular contextual category. The context may be derived from the location within the textual map. For example, lighter colors may be indicative of a context at one end of a spectrum while darker colors may represent context at the other end of the same spectrum. In some embodiments, a contextual map for a particular category may be sub divided into smaller contextual maps with data elements mapped therein according to an arrangement that allows context to be derived based on differences in color.

After the textual elements have been mapped into data categories 506*a*, 506*b*, and 506*c*, they can be consolidated into datasets 508*a*, 508*b*, and 508*c*. At this point, the dataset contains only the specific colors that mapped to the specific textual elements. It is appreciated then, that at this point these datasets could be reversed back to their explicit textual data through the original contextual maps.

However, the consolidated datasets can also be further obfuscated in a manner that maintains contextual meaning while destroying the ability to reverse determine the original data. For example, dataset 508*a* may be blended using an IEE to produce a single resulting representation 512*a*. Likewise, consolidated set 508*b* may become 512*b*, and 508*c* may become 512*c*.

Because each of the original data elements were mapped into a contextual data category and further mapped into that category according to an internal meaning within that category represented by a degree or type of color variation, combining or aggregating the individual elements can produce an aggregate contextualization of the consolidated dataset. For example, if several textual elements are mapped onto a contextual map in a zone that is characterized by dark red while one textual element is mapped into the contextual map in a zone characterized by light red, a simple averaging aggregating function will likely result in a single representation (e.g., element 512*a*) that is on the darker side end of the contextual spectrum. This darker color is a contextual representation of the underlying data suggesting that the dataset as a whole was contextually linked to whatever contextual meaning is assigned to the darker zones in the contextual map.

As was previously described, simple averaging is not the only aggregating function that may be utilized. Summing or weighted aggregation can also be used. For example, particular areas within a contextual map may be identified as hot-spots and treated differently in an aggregation function than other places. Accordingly, different weighting may be applied to individual elements in a contextual map or even zones containing multiple elements near each other. The converse may also be true where certain elements are treated as lower value information depending on their location. It is also appreciated that the weighting may be dynamic and based on the presence of other elements. For example, if a threshold number of elements are mapped into a certain zone, that zone may then be treated differently than if fewer elements are present.

Thus, it is appreciated that element 512a of FIG. 5B is represented by a color that is a simple average of the individual elements within consolidated set 508a. The same is true for element 512b and 512c with regard to consolidated sets 508b and 508c, respectively.

Returning again to the idea of privacy, the illustrated singular representations cannot be reverse determined back to the individual elements within the consolidated set 508a. Even if one knew the number of elements originally within the consolidated sets, it would be impossible to know the precise color, and therefore the precise textual data, the produced the final singular representation.

This privacy is further enabled through the use of a rules engine 510 within the IEE. Within these rules, enormously complex structure can be established and implemented to ensure that contextual meaning is maintained while actual textual data underlying the representation is eliminated.

Figure 6A:
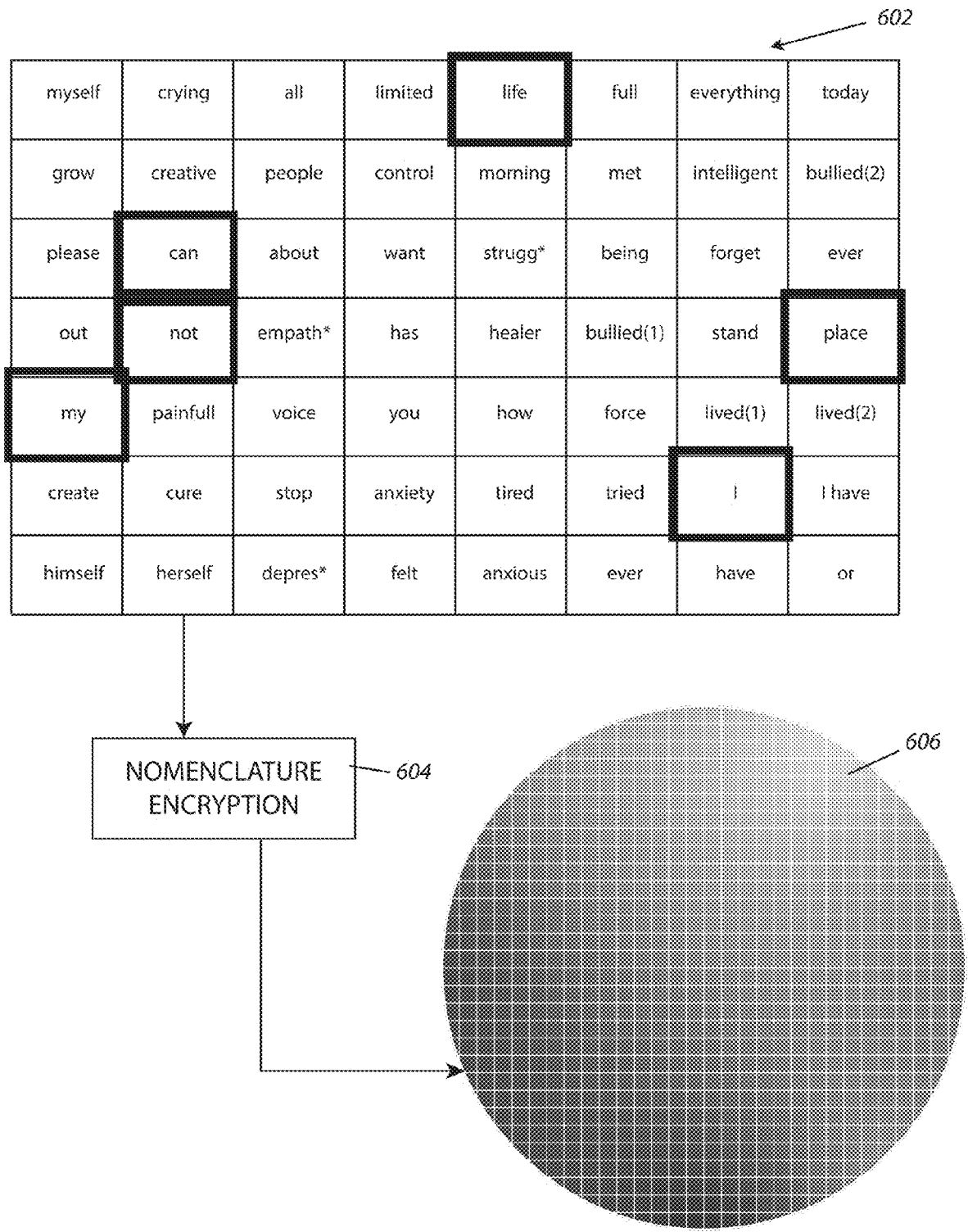
FIG. 6A illustrates generating a user-specific nomenclature according to one or more embodiments of the present disclosure.
Figure 6B:
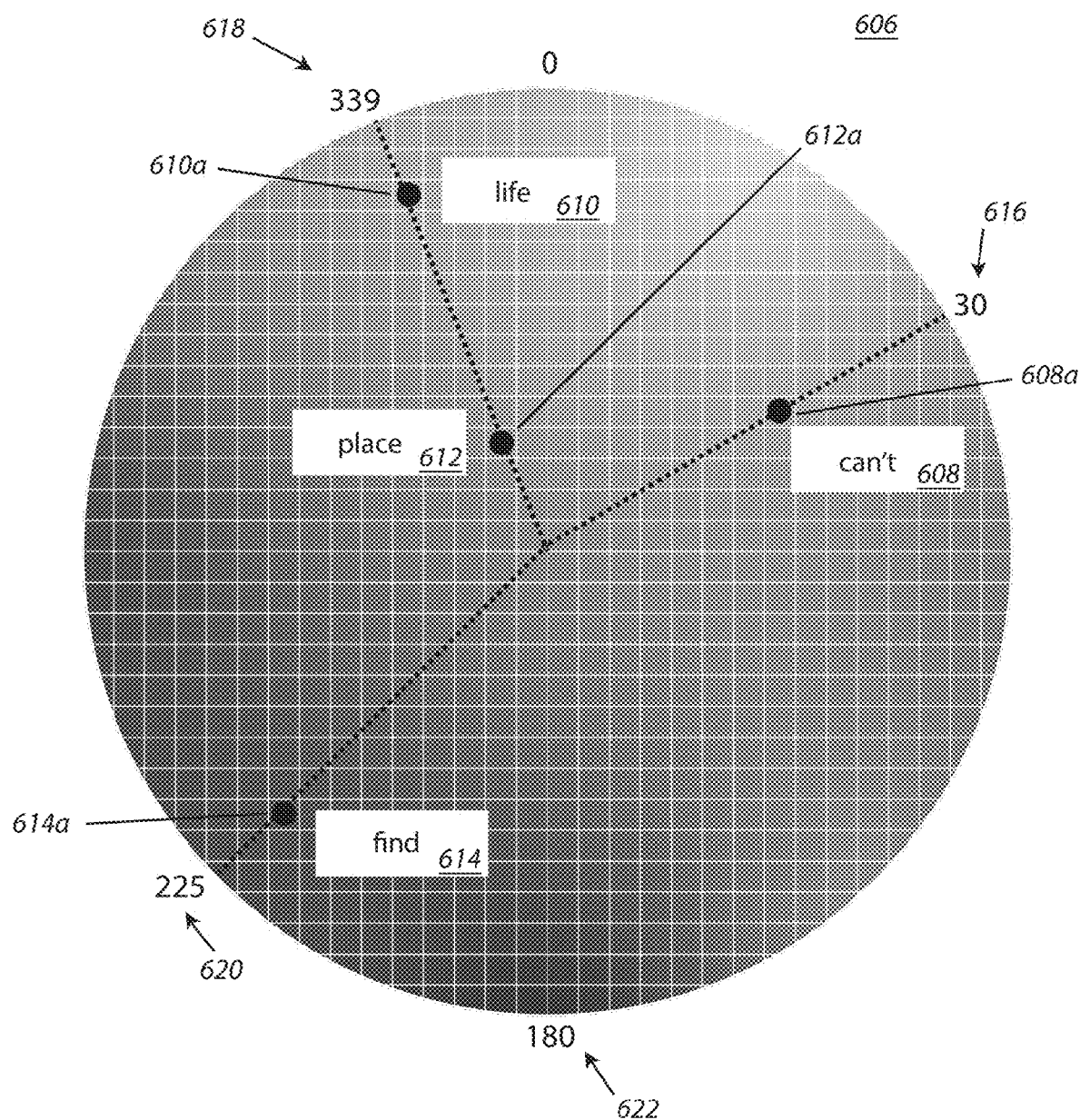
FIG. 6B illustrates contextually mapping a user-specific nomenclature according to one or more embodiments of the present disclosure.
Figure 6C:
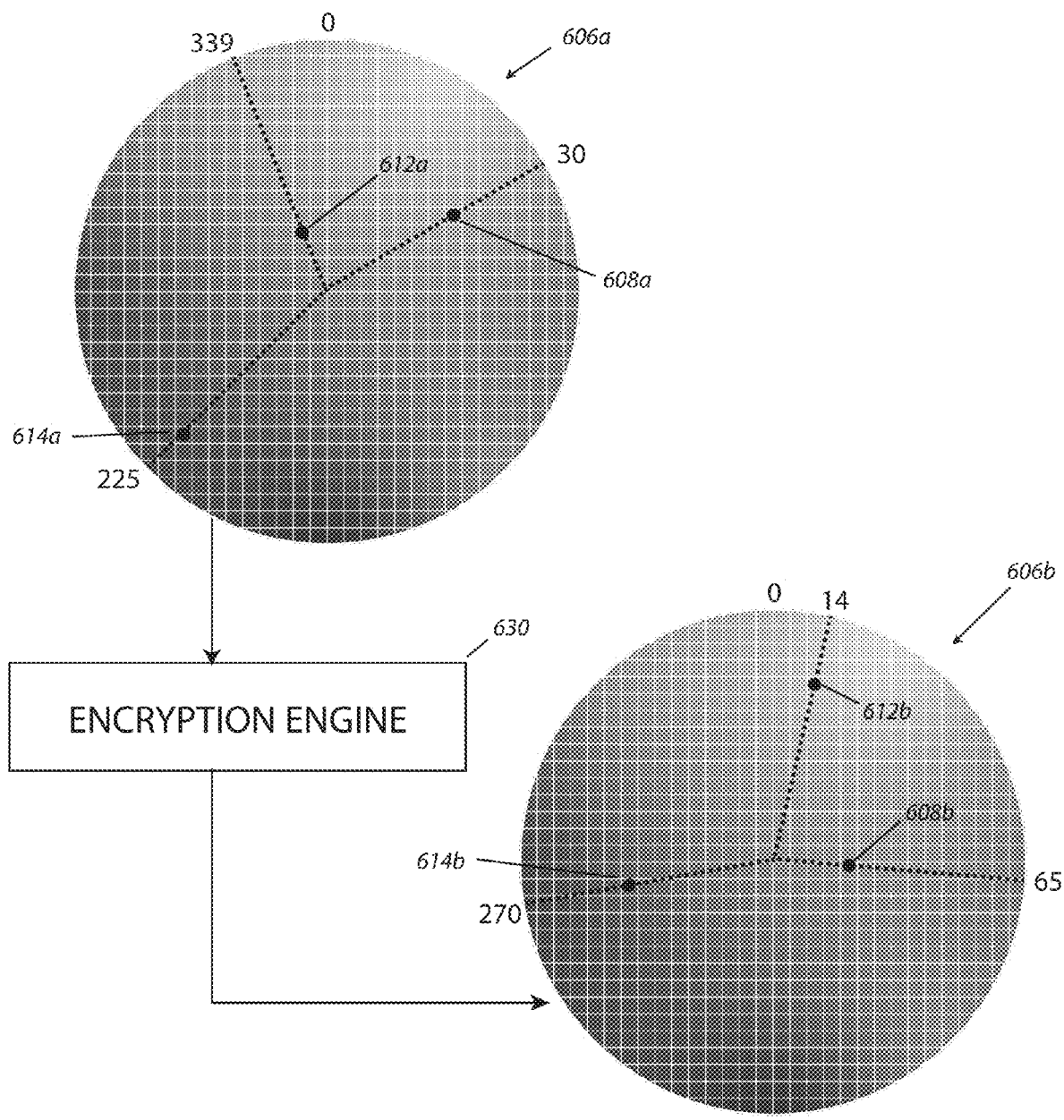
FIG. 6C illustrates cyphering a contextually mapped user-specific nomenclature according to one or more embodiments of the present disclosure.

Various Exemplary Embodiments of Systems and Methods for Applying Multi-Dimensional Obfuscation Turning to FIGS. 6A through 6C another type of interactive encryption is illustrated. As previously described, a user nomenclature may be developed for a particular user from a textual data stream that is linked to the user. For example, as textual data is produced, metadata identifying a source of the textual data may be included such that the textual data can be linked to the source. In one example, facial recognition software may be implemented when processing video data. As the textual data is created, including both textual data describing the event as well as textual data describing a context of the event, an identifier of the source may also be included.

Thus, nomenclature map 602 may be generated for a particular source and include textual data linked to that source. In the map 602, individual words are included. However, as has been previously described, phrases may also be included. However, to ensure privacy, entire phrases linked to a user—such as phrases spoken by the user—may not be included. Instead, portions of phrases showing, for example, unique combinations of words or usage patterns may be retained.

As previously described, the textual data within the user's nomenclature may then be mapped to a contextual map that represents the data according to a non-textual representation, such as a number or a color. This may be performed by a nomenclature engine 604 and placed on to a contextual map 606. As illustrated, contextual map 606 is shown as a singular map with a wide variety of colors. As has been previously described, different colors may indicate different context. Similarly, different zones within map 606 may be representative of different contexts. In some cases, colors within the map that are different but that are closer to each other may represent greater contextual similarity.

In FIG. 6B, four textual elements from nomenclature 602 are shown as they may be mapped onto contextual map 606. For example, element 608 represents the textual element "can't," 610 is "life," 612 is "place," and 614 is "find." Further, element 608a represents the location within map 606 corresponding to element 608. It is also appreciated that element 608a is illustrated as being on a line corresponding to a particular rotation location 616 corresponding to 30 degrees.

Likewise, element 610 is located at location 610a on line 618 corresponding to 339 degrees, element 612 is at location 612a on line 618, and element 614 is at location 614a on line 620 corresponding to 225 degrees.

Thus, it can be appreciated that each textual element 608 through 614 can be described with respect to map 606 according to a rotational dimension corresponding to a location on the map expressed in degrees and a radial dimension expressed in distance from a center point 622. Notably, the textual data is also still representable by the visual representation previously described (e.g., element 608 as some shade of green, element 610 orange, element 612, darker orange, and element 614 in the purple range.)

Moving to FIG. 6C, a new type of obfuscation is illustrated. In essence, the information represented in map 606a may be transformed into the representation in map 606b. This transformation, performed by an IEE 630, may be a simple transformation comprising a static modification of either or both of the radial and rotational values. For example, as illustrated, element 612a may be rotated 35 degrees from 339 to 14 degrees, element 608a moves 35 degrees from 30 to 65 degrees, and element 614a moves 35 degrees from 225 to 270 degrees.

However, as illustrated, each of the elements is translated differently with regard to the radial dimension. Element 612a moves farther from center to become 612b, 608a moves closer to center to become 608b, and 614a moves closer to become 614b. As has been previously described, these rules may be based on the particular context associated with the data element or on some other variable. For example, elements within a particular context may always move closer to center when translated along the radial vector while others may move farther from center. Some contextual elements may not change radial dimension. The same is true for the rotational vector where some contextual data moves differently as compared to other contextual data.

In one embodiment, the formula for translating the originally mapped contextual data (e.g., the data in map 606a) into obscured data (e.g., the data in map 606b) may be based on a cypher that is linked to the data subject. For example, a facial map may be created for an identified user. Elements within the facial map may then be linked to particular contextual data zones (e.g., color zones) such that any contextual data originally mapped within that zone will be translated into a different zone based on the facial map. Other similar user-specific cyphers are contemplated (e.g., audio based, location based, assigned ID, etc.).

Once the contextual data has been subject to the cypher, the dataset may then be stored in the manner previously described.

Figure 7A:
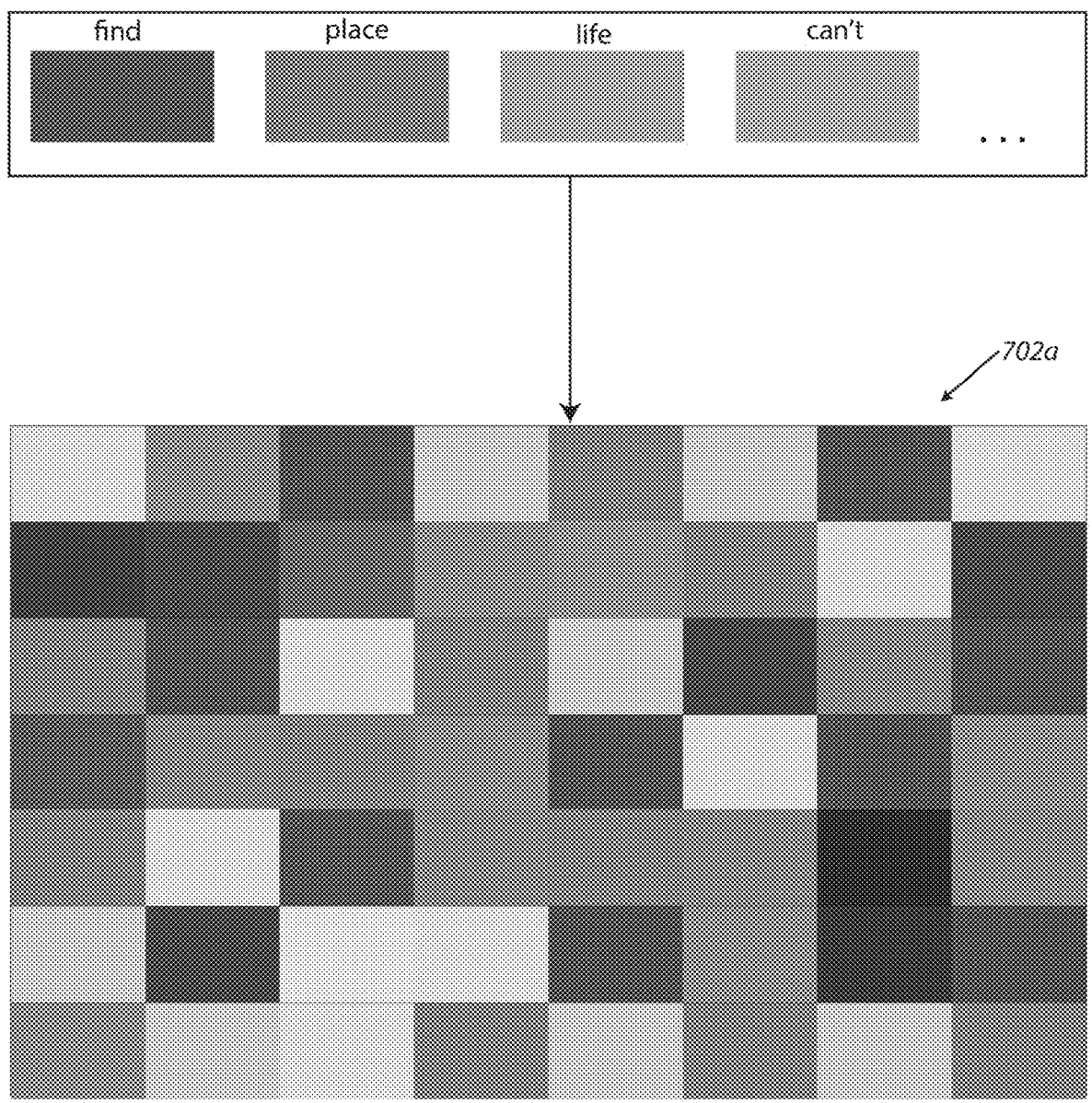
FIG. 7A illustrates one embodiment of a user-specific nomenclature that has been obfuscated into visual representations.
Figure 7B:
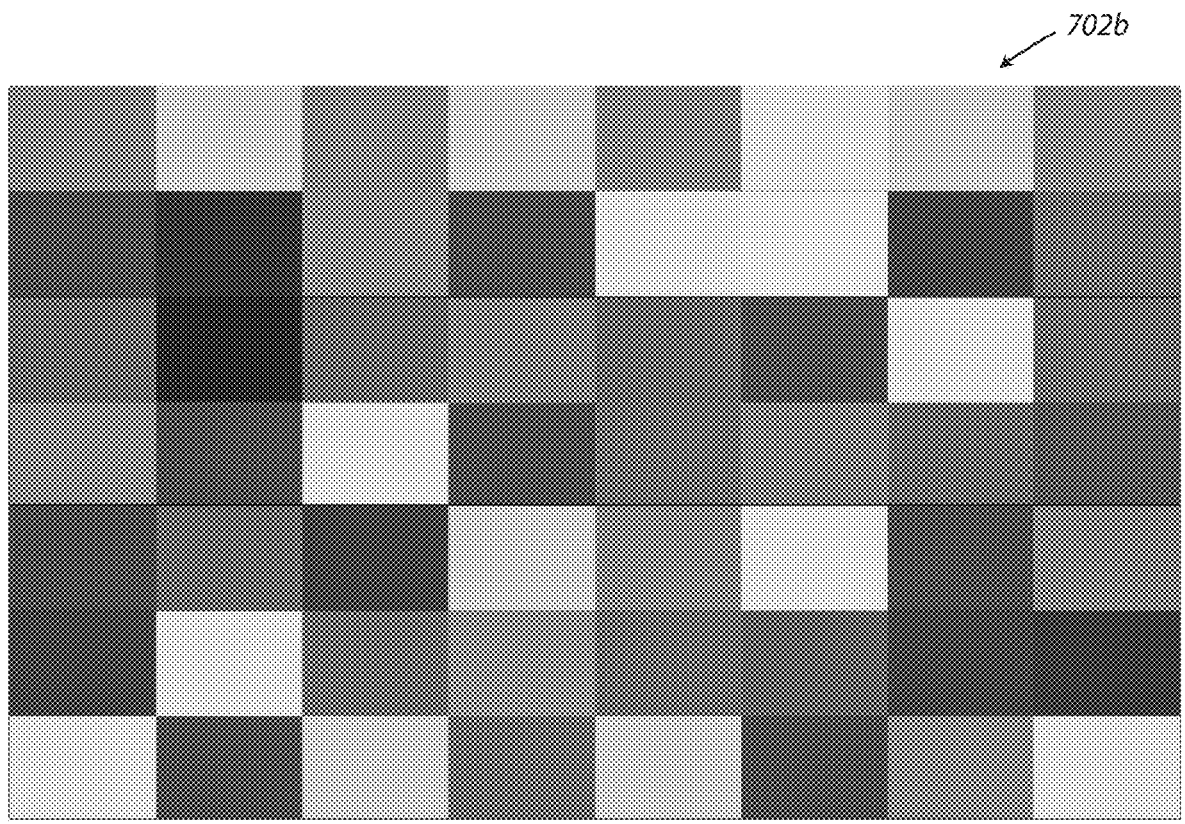
FIG. 7B illustrates an obfuscated user-specific nomenclature that has been cyphered according to one or more embodiments of the present disclosure.

For example, FIGS. 7A and 7B show a user nomenclature 702a (FIG. 7A) and a cyphered version of that same nomenclature (nomenclature 702b in FIG. 7B). As previously described, the textual elements 704 may be pulled from a contextual map and used to populate a user nomenclature 702a. Then, using the user derived cypher, nomenclature 702a can be translated into an encrypted nomenclature bank 702b.

As can be appreciated, because the cypher or encryption key is user specific, having access to only encryption bank 702b makes it impossible to reverse determine the original contextual data.

It is also anticipated that the described cyphered obfuscation can also be combined with the previously described blending obfuscation. For example, once a blended dataset (such as dataset 512 of FIG. 5B) is created, the individual elements comprising the dataset may be mapped on a contextual map and then subjected to a user derived cypher before final storage. In this way, not only is the underlying textual data obscured through the blending, but the resulting contextual meaning is further obscured through the user derived cypher.

Another benefit of producing singular blended representations of contextual information for a particular user is the ability to track the state of the context for the user over time.

Figure 8A:
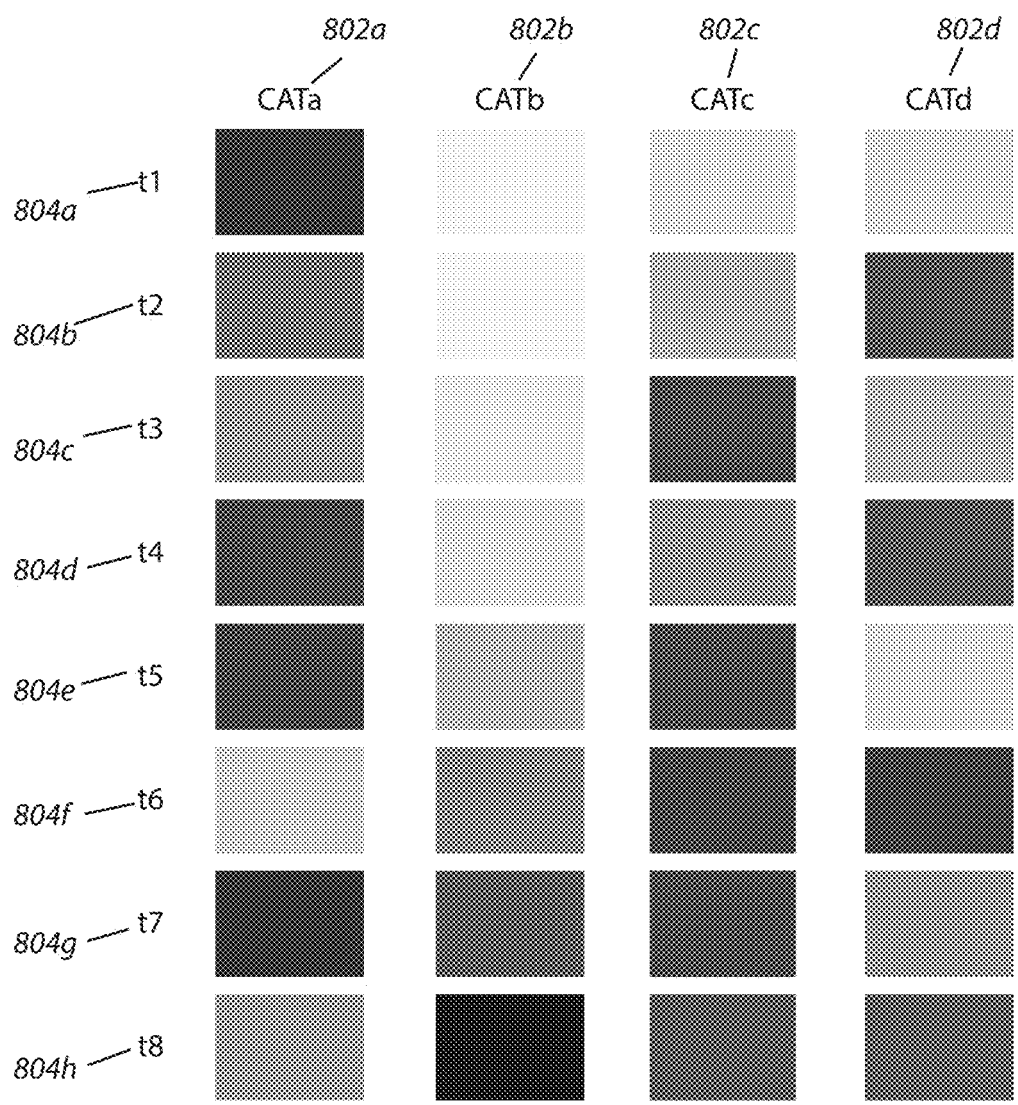
FIG. 8A illustrates a time-based record of contextual visualizations for multiple data contexts according to one or more embodiments of the present disclosure.
Figure 8B:
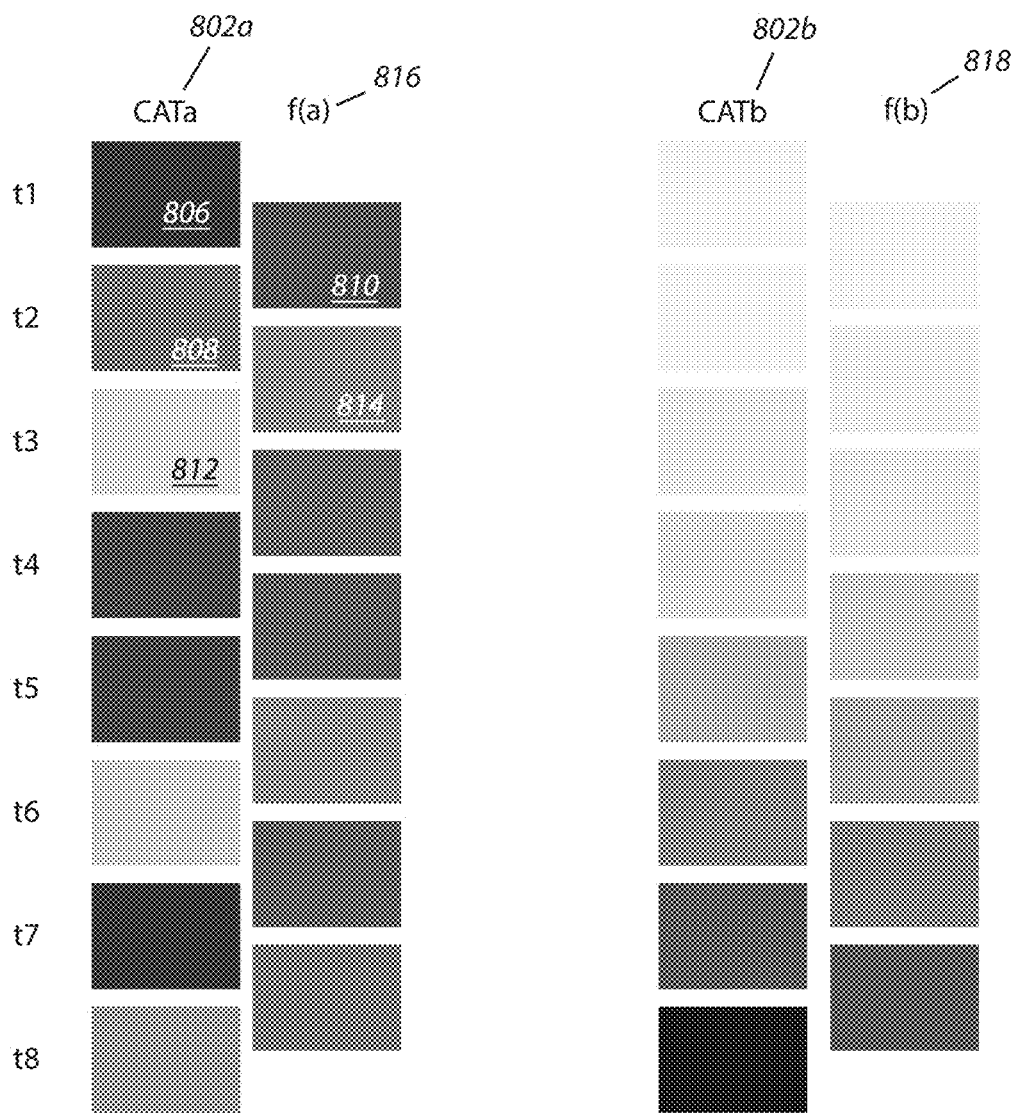
FIG. 8B illustrates a historical time-based record of contextual visualizations for multiple data contexts according to one or more embodiments of the present disclosure.

FIGS. 8A and 8B illustrate how a current context for a user in one or more contextual categories can be tracked without divulging—or even being able to determine—the precise underlying textual data that produced the contextual meaning.

FIG. 8A illustrates four contextual data categories 802a, 802b, 802c, and 802d. As previously described, each of these contextual categories may be linked to a contextual map that includes data elements that are related. In one example, category 802a may represent context relating to emotional language, 802b may represent context relating to action language, 802c may represent context relating to threat language, and 802d may represent context relating to victim language. It is appreciated that these categories are merely examples and that the contextual mappings may overlap.

FIG. 8A also illustrates eight time periods labeled from 804a at time period 1 through 804h at time period 8. Each of the intervening time periods are contemplated to occur between period 804a and 804h. However, the amount of time between each time period may vary.

It is also appreciated that the timing between each time period may be different for each category. In other words, FIG. 8A can be read to indicate that for each category, eight different time periods are associated with a different contextual indication. However, in at least some instance, the time periods may coincide for one or more of the categories.

One benefit of the ability to track contextual meaning at discrete points over time is the ability to measure the degree of contextual variance at a particular time as compared to historical information. For example, if a user typically reads higher than average on a contextual threat spectrum but is known to not actual act on threats, a slightly higher current contextual threat may not be as notable as a high contextual threat from a person that typically has low contextual threat levels. Of course, the reverse may also be true.

Thus, incorporating the concepts previously described, at "t1" within "CATa" the user is assigned a visual contextual representation of the represented color 806. This color may be a blended representation of a series of textual data elements that have been mapped to a contextual map, consolidated, and then blended within an IEE such as described in conjunction with FIG. 5B. Similarly, visual contextual representation 808 may represent a textual data stream received during "t2" and may also be a consolidated and blended representation of all of the textual elements associated with context 802a during the time period correspond to "t2." The same may then be true for each of the visual representations associated with category 802a for the time periods "t3" through "t8."

As can be appreciated, each of the individual visual representations can be utilized at the particular point in time to make present determinations about the user associated with the visualizations. For example, comparing visualization 806 to visualization 808 yields an understanding that visualization 808 is at a different location on the contextual spectrum associated with category 802a by virtue of visualization 808 being a lighter color than visualization 806. As previously described, this may mean that visualization 806 is a more severe indication of the particular context such as a stronger indication of negative emotional context than visualization 808. It is also understood that since the visualizations are ultimately a contextual representation of a textual data stream that was ingested, it can be understood that the user's contextual state during the identified time period is represented by the color even though the underlying textual data is not explicitly represented by the color.

Because of this, a change in color represents a change in the contextual meaning of whatever data stream was processed in the new time period for the user. This change in contextual meaning can be relied on to trigger particular types of responses or particular degrees of response.

As can also be appreciated from FIG. 8A, the contextual visualizations across the categories associated with a particular time period may not follow the same patterns or trends. At any particular time period, one or more of the categories may indicate an increase in contextual relevance, or a decrease in contextual relevance.

This information may be used to determine that from period "t1" to period "t2" the textual context for the user changed position on the contextual spectrum for the category in a particular direction. It can also be used to determine the magnitude or the scale of that change. This is possible by using a calculation to determine the distance between the two colors within a particular contextual map. In some embodiments, this may be done using a mathematical operation to determine the number of steps between the two colors. For example, if hex codes are being used as the basis for the colorized visuals, the distance between a red of "770000" and a red of "780000" is one.

It can be appreciated that if using mixed colors, such as "775522" a different measurement for distance may be necessary. As previously described, the concept of degrees on a circular map and a radial distance from a center point may also be used to determine a degree of contextual relatedness such that a degree of difference between two visual representations may be determined.

Regardless of the manner of determining variability among visual representations from one time period to the next, it is appreciated that different types of responses may be implemented based on thresholds or other rules that compare the degree or type of difference that is observed between one time period and the next.

While the representations in FIG. 8A can be useful to identify a change from one time period to the next, FIG. 8B illustrates how the individual representations can be combined overtime to maintain a present representation of a user based on incorporating historical information.

In FIG. 8B, the same category 802a and category 802b are illustrated. However, both categories now have an additional column associated with functions 816 and 818, respectively. The column associated with function 816 may represent a historical function that tracks the present baseline level of a user for a particular contextual category. For example, assuming that element 806 is the very first element received for a user within category 802a, the current baseline context level for the user is the value of the color 806.

At a next time period, new textual data may be received and processed as previously described to arrive at a contextual visualization 808. It is appreciated, however, that visualization 808 is not related to visualization 806. Instead, it simply represents new textual data context that arrived during a later time period.

However, the function 816 may be relied on to track a historically based visualization that is derived from the discrete visualizations. For example, visualization 810 may be formed through an aggregating function that uses visualizations 806 and 808 as inputs. In one example, the inputs may be averaged together with equal weight. In other embodiments, different aggregating functions may be used such as weighted averages, weighted sums, or the like.

At a third time period, visualization 812 may be produced as a representation of textual data received in the third time period. The function 816 may then aggregate visualization 812 into the historical representation. This can be accomplished by aggregating the new visualization 812 with the previous historical aggregate 810 to produce current historical aggregate 814. As can be appreciated, aggregate 814 now represents the aggregated contextual information from discrete visualizations 806, 808, and 812 according to the type of aggregating function that is used.

As can be appreciated by comparing the results of the function 816 to function 818, different patterns may be identified over time. For example, function 816 shows generally stable aggregated contextual values even though the discrete values in the various time periods are significantly more variable. On the other hand, function 818 generally tracks the increasing value of the discrete visualizations within 802b.

In some embodiments, different processing capabilities and componentry may be focused at the discrete visualization stream than is utilized for the historical aggregating function stream.

For example, a Markov chain analyzer (MCA), such as the Markov analyzer 320 illustrated in FIG. 3, may be configured to focus on the discrete time periods associated with data context categories such as 802a and 802b. The purpose of an MCA is to account for present conditions. This is particularly helpful when a user may be associated with a great deal of historical contextual data that has a significant amount of historical weighting. When large amounts of historical data exist, any singular reading may not alter the historical aggregation to a degree that appears significant. However, it is appreciated that some discrete readings may be worthy of response regardless of historical knowledge. Accordingly, an MCA may be configured to consider only a current discrete time period and the contextual value of that present time period. If a threshold has been met for a given time period, the MCA may trigger a response or another operation to occur.

In other configurations, an MCA may be configured to account for some degree of historical information when considering a discrete time period. For example, if a discrete value appears to meet a threshold value required for a response, the MCA may additionally check that against a historical aggregation. In some embodiments, the response may be cancelled if, for example, the discrete value is close enough to the historical aggregation.

Various Exemplary Embodiments of Systems and Methods for Generating Contextually Relevant Verbal Responses As has been previously described, textual data streams may be represented by visualizations that capture and retain the context of the original textual data while eliminating the ability to directly reverse determine the content of that original textual data. Once the context has been determined, a response may be triggered based on a current contextual condition.

In one embodiment, the response may include presenting a textual prompt to a person that can interact with the user that is linked to the contextual data (and whose contextual information triggered the response). This can be accomplished through a computer program that outputs information on a computer screen operated by the person that receives the prompt.

A library of template responses may be available to the person. However, because the person is not aware of the underlying textual data used to trigger the response, the person does not know what an appropriate response or interaction may look like. Accordingly, the contextual data may be used to identify a response from within the library that is appropriately related to the contextual value that triggered the response.

For example, suppose a video stream was ingested and converted into a textual data stream. Upon mapping that textual data into a plurality of contextual data categories, a contextual value is returned within a category for "emotional stress" that exceeds a predetermined threshold.

Upon meeting the threshold, a person known to interact with the user may receive a prompt at a device to ask a question from a question bank that is also linked to "emotional stress." Additionally, the particular question may be identified solely based on the contextual value that triggered the response. Said another way, the response may be selected by comparing, for example, the color value that exceeded the threshold to a response that was assigned the same or a similar color value. In this way, responses can be mapped to observed contextual information without requiring linking the explicit textual data at the basis of the observed contextual value.

As has been previously described, at ingestion of a textual data stream, two types of data or two different data streams may be produced. In the first data stream, the contextual data is encrypted or otherwise obfuscated in any of the manners previously described. This may be accomplished by the previously described IEE and stored in the obfuscated form.

At the same time data is being ingested and fed to the IEE system, a second process may occur that involves generating a user-specific nomenclature. This concept is illustrated in FIG. 9 that illustrates and ingestion system 902 populating a nomenclature map 904.

Within nomenclature map 904, specific words or phrases identified from the contextual data stream are stored. Notably, these words and phrases are stored in a way that limits or totally eliminates their interrelationships. For example, the nomenclature map 904 shows a portion of a nomenclature that would include the phrase, "I cannot find my place in this life." At least some of the component words within this textual phrase are represented within the nomenclature 904, but the sequence of the words is not retained such that it is not possible to reverse determine the source textual phrase.

Figure 9:
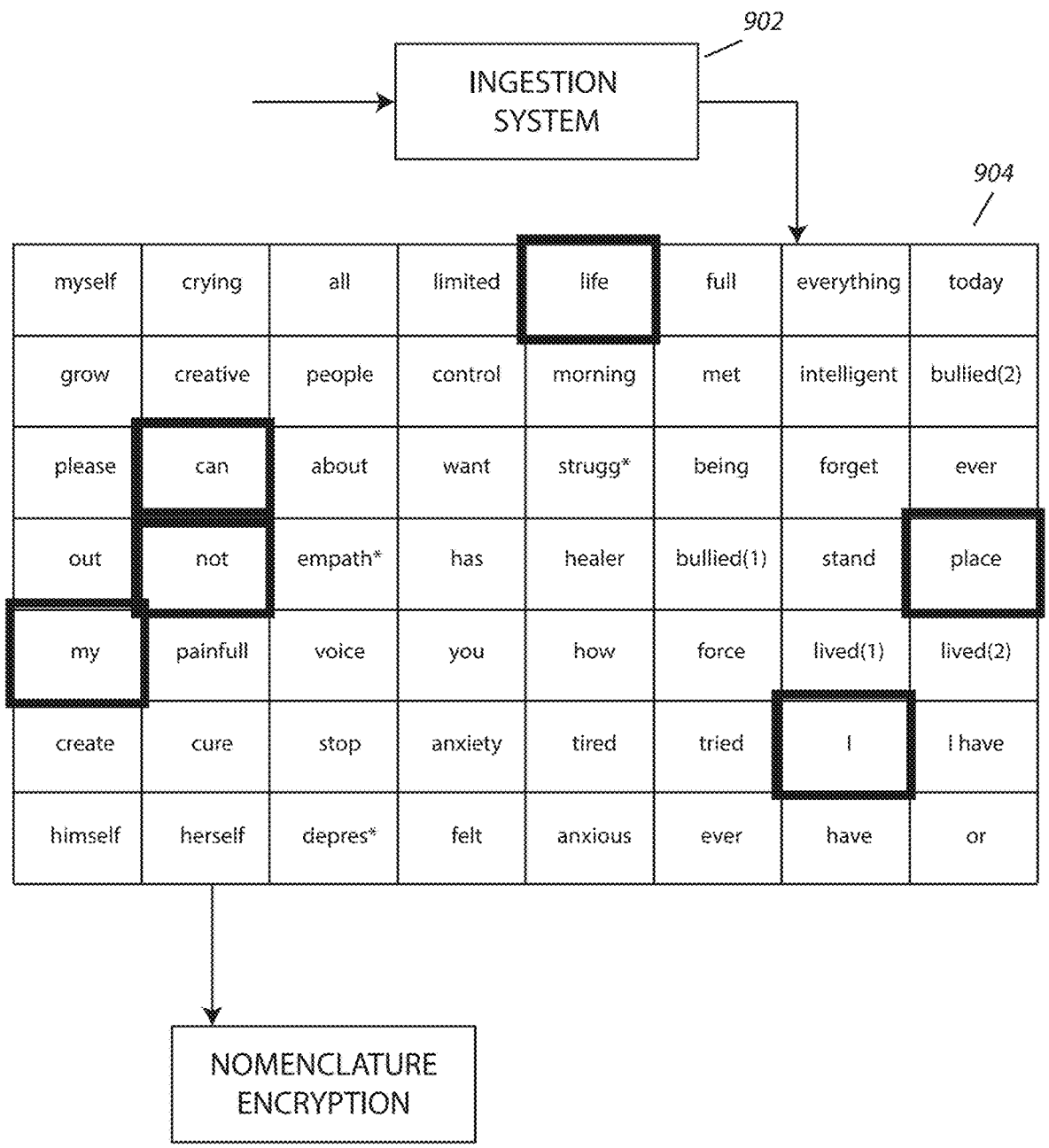
FIG. 9 illustrates a user-specific nomenclature for customizing prompts according to one or more embodiments of the present disclosure.

FIG. 9 also illustrates that once the nomenclature 904 is created (or new entries for addition into an existing nomenclature are created), the nomenclature 904 may be encrypted as previously described. For instance, each of the individual elements may be mapped to a contextual map and assigned a visualization such as a color. Those colors may be further obfuscated by applying a shift, cypher, or additional encryption such that a given element in one nomenclature may be represented differently than in a different nomenclature even though their underlying context is identical.

For example, nomenclature 904 may be representative of a textual data stream received for a user during a particular time period. The textual elements in nomenclature 904 may be added to an existing nomenclature for the user such as nomenclature 1010 illustrated in FIG. 10.

Figure 11:
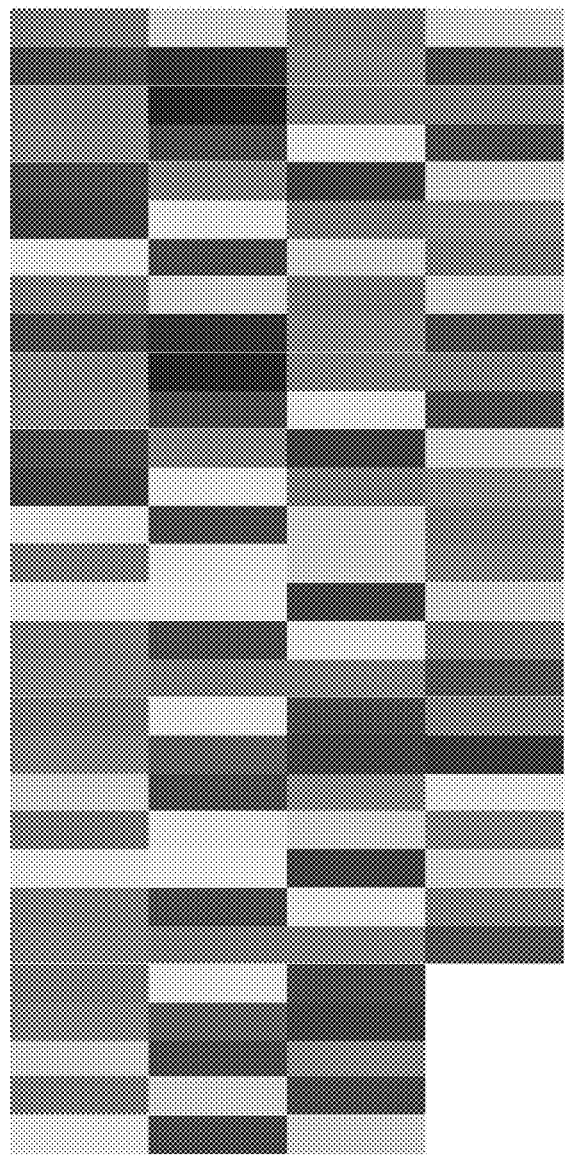
FIG. 11 illustrates an obfuscated user-specific nomenclature for customizing prompts according to one or more embodiments of the present disclosure.

The modified nomenclature 1010 may then be subjected to the encryption methods previously described. For example, nomenclature 1010 may be run through an IEE to produce the visual nomenclature 1110 shown in FIG. 11. Here, each element within nomenclature 1010 has been mapped to a contextual map and a corresponding visual representation has been returned. FIG. 11 may also represent a visual representation that has been further modified by applying a user specific obfuscation, such as a facial recognition cypher, as previously described.

Accordingly, visual nomenclature 1010 includes visual representations of individual textual elements. In previous descriptions of applying an IEE, the underlying contextual information is retained until an aggregating function is applied. In the case of a visual nomenclature, blending will typically not be applied because the actual textual information is desirable to obtain. However, it may be beneficial for privacy or for processing efficiencies to store the textual data as colors or another visualization concept in at least some circumstance.

Figure 12:
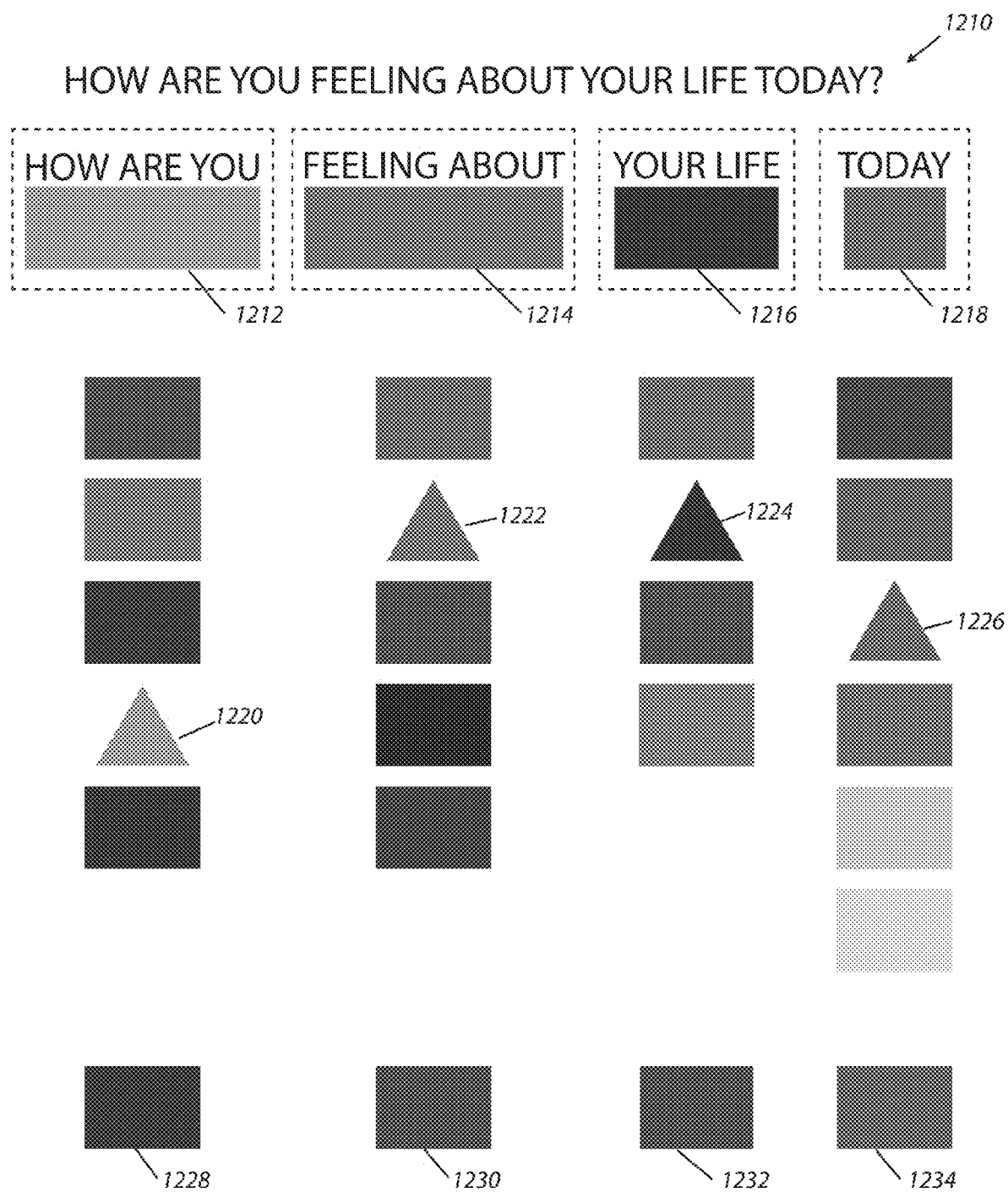
FIG. 12 illustrates customizing a contextually selected prompt using a user-specific nomenclature according to one or more embodiments of the present disclosure.

Returning now to the concept of producing responses that can be used to interact with or intervene with a user that has met a contextual threshold, FIG. 12 illustrates one embodiment for formulating a customized response.

Here, the predetermined response 1210 that matches the contextual value that met or exceed the response threshold is "How are you feeling about your life today?" Such a response may have been triggered by a user meeting a threshold relating to emotional stress that indicates that the user is presently experiencing heightened emotional stress.

While the predetermined response is known to be contextually relevant to the trigger, the user specific nomenclature can be used to improve response by replacing elements within the response with elements from the user's nomenclature.

To accomplish this, components within the response may be identified and grouped into different types. For example, the response 1210 may be partitioned into portions 1212 through 1218. Those individual portions may then be mapped in a similar way as previously described and represented by a color or other visualization.

The visualization for each portion can then be mapped against the user specific nomenclature to determine whether an appropriate custom textual element can be inserted into the phrase to replace the generic response.

For example, the triangles 1220 through 1226 represent the color value for the respective portions of the response 1210. The colored rectangles above and below each triangle represent the closest visual representations of textual data from within the user specific nomenclature (e.g., nomenclature 1110 of FIG. 11). As has been previously described, textual data can be grouped within a contextual map such that words or phrases that are closely related are closer in color value. In this way, a generic word or term that is at a particular color value may be replaced by a different word or term that is sufficiently close in color value.

Thus, a response can be customized (e.g., at question generator 314 of FIG. 3) by using contextual maps. As illustrated, it may be determined that the word or phrase 1228 is sufficiently close to the phrase "how are you" such that response 1210 can be modified to use that user nomenclature element. The same may be true for elements 1230, 1232, and 1234 for their respective portions of response 1210.

The customized response may then be presented to a person in a way that allows the response to be presented in an interaction with the user that triggered the response.

In some embodiments, the contextual maps used for nomenclature customization will be different than the contextual maps used for mapping contextual meaning. For example, the contextual maps used to track the mindset of a user may group words and phrases differently than contextual maps that are used primarily to identify similar but alternate word usage. For this reason, different types of contextual maps may be used in different portions of the described systems.

Computer Systems of the Present Disclosure

It will be appreciated that computer systems are increasingly taking a wide variety of forms. In this description and in the claims, the term "computer system" or "computing system" is defined broadly as including any device or system—or combination thereof—that includes at least one physical and tangible processor and a physical and tangible memory capable of having thereon computer-executable instructions that may be executed by a processor. By way of example, not limitation, the term "computer system" or "computing system," as used herein is intended to include personal computers, desktop computers, laptop computers, tablets, hand-held devices (e.g., mobile telephones, PDAs, pagers), microprocessor-based or programmable consumer electronics, minicomputers, mainframe computers, multi-processor systems, network PCs, distributed computing systems, datacenters, message processors, routers, switches, and even devices that conventionally have not been considered a computing system, such as wearables (e.g., glasses).

The memory may take any form and may depend on the nature and form of the computing system. The memory can be physical system memory, which includes volatile memory, non-volatile memory, or some combination of the two. The term "memory" may also be used herein to refer to non-volatile mass storage such as physical storage media.

The computing system also has thereon multiple structures often referred to as an "executable component." For instance, the memory of a computing system can include an executable component. The term "executable component" is the name for a structure that is well understood to one of ordinary skill in the art in the field of computing as being a structure that can be software, hardware, or a combination thereof.

For instance, when implemented in software, one of ordinary skill in the art would understand that the structure of an executable component may include software objects, routines, methods, and so forth, that may be executed by one or more processors on the computing system, whether such an executable component exists in the heap of a computing system, or whether the executable component exists on computer-readable storage media. The structure of the executable component exists on a computer-readable medium in such a form that it is operable, when executed by one or more processors of the computing system, to cause the computing system to perform one or more functions, such as the functions and methods described herein. Such a structure may be computer-readable directly by a processor—as is the case if the executable component were binary. Alternatively, the structure may be structured to be interpretable and/or compiled—whether in a single stage or in multiple stages—so as to generate such binary that is directly interpretable by a processor.

The term "executable component" is also well understood by one of ordinary skill as including structures that are implemented exclusively or near-exclusively in hardware logic components, such as within a field programmable gate array (FPGA), an application specific integrated circuit (ASIC), Program-specific Standard Products (ASSPs), System-on-a-chip systems (SOCs), Complex Programmable Logic Devices (CPLDs), or any other specialized circuit. Accordingly, the term "executable component" is a term for a structure that is well understood by those of ordinary skill in the art of computing, whether implemented in software, hardware, or a combination thereof.

The terms "component," "service," "engine," "module," "control," "generator," or the like may also be used in this description. As used in this description and in this case, these terms—whether expressed with or without a modifying clause—are also intended to be synonymous with the term "executable component" and thus also have a structure that is well understood by those of ordinary skill in the art of computing.

While not all computing systems require a user interface, in some embodiments a computing system includes a user interface for use in communicating information from/to a user. The user interface may include output mechanisms as well as input mechanisms. The principles described herein are not limited to the precise output mechanisms or input mechanisms as such will depend on the nature of the device. However, output mechanisms might include, for instance, speakers, displays, tactile output, projections, holograms, and so forth. Examples of input mechanisms might include, for instance, microphones, touchscreens, projections, holograms, cameras, keyboards, stylus, mouse, or other pointer input, sensors of any type, and so forth.

Accordingly, embodiments described herein may comprise or utilize a special purpose or general-purpose computing system. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example—not limitation—embodiments disclosed or envisioned herein can comprise at least two distinctly different kinds of computer-readable media: storage media and transmission media.

Computer-readable storage media include RAM, ROM, EEPROM, solid state drives ("SSDs"), flash memory, phase-change memory ("PCM"), CD-ROM or other optical disk storage, magnetic disk storage or other magnetic storage devices, or any other physical and tangible storage medium that can be used to store desired program code in the form of computer-executable instructions or data structures and that can be accessed and executed by a general purpose or special purpose computing system to implement the disclosed functionality of the invention. For example, computer-executable instructions may be embodied on one or more computer-readable storage media to form a computer program product.

Such a computer program product (i.e., a computer program product that is stores computer-executable instructions) may also be referred to as hardware storage media, a hardware storage device, or other similar language that is understood by one having ordinary skill in the art to represent a hardware element that is capable of persistent storage. Notably, persistent storage should be understood as meaning the ability to store data for access or processing at a computer system at a later time. On the other hand, persistent storage should not be interpreted to require absolute persistence because no device at the time of the invention is capable of truly and universally persistent storage because over time all storage devices are subject to corruption and loss of data based on physical constraints. Thus, as used herein, a hardware storage device (or the like) should be interpreted as a device that has a primary purpose of storing information and in contrast to a device or hardware element that has a primary purpose of transmitting information even though both types of hardware may be capable of both types of activities to some degree.

Transmission media can include a network and/or data links that can be used to carry desired program code in the form of computer-executable instructions or data structures and that can be accessed and executed by a general purpose or special purpose computing system. Combinations of the above should also be included within the scope of computer-readable media.

Further, upon reaching various computing system components, program code in the form of computer-executable instructions or data structures can be transferred automatically from transmission media to storage media (or vice versa). For example, computer-executable instructions or data structures received over a network or data link can be buffered in RAM within a network interface module (e.g., a "NIC") and then eventually transferred to computing system RAM and/or to less volatile storage media at a computing system. Thus, it should be understood that storage media can be included in computing system components that also—or even primarily—utilize transmission media.

Those skilled in the art will further appreciate that a computing system may also contain communication channels that allow the computing system to communicate with other computing systems over, for example, a network. Accordingly, the methods described herein may be practiced in network computing environments with many types of computing systems and computing system configurations. The disclosed methods may also be practiced in distributed system environments where local and/or remote computing systems, which are linked through a network (either by hardwired data links, wireless data links, or by a combination of hardwired and wireless data links), both perform tasks. In a distributed system environment, the processing, memory, and/or storage capability may be distributed as well.

Those skilled in the art will also appreciate that the disclosed methods may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud-computing model can be composed of various characteristics, such as on-demand self-service, broad network access, resource pooling, rapid elasticity, measured service, and so forth. A cloud-computing model may also come in the form of various service models such as, for example, Software as a Service ("SaaS"), Platform as a Service ("PaaS"), and Infrastructure as a Service ("IaaS"). The cloud-computing model may also be deployed using different deployment models such as private cloud, community cloud, public cloud, hybrid cloud, and so forth.

Although the subject matter described herein is provided in language specific to structural features and/or methodological acts, it is to be understood that the subject matter defined in the appended claims is not necessarily limited to the described features or acts so described. Rather, the described features and acts are disclosed as example forms of implementing the claims.

CONCLUSION

Unless defined otherwise, all technical and scientific terms used herein have the same meaning as commonly understood by one of ordinary skill in the art to which the present disclosure pertains.

Various aspects of the present disclosure, including devices, systems, and methods may be illustrated with reference to one or more embodiments or implementations, which are exemplary in nature. As used herein, the term "exemplary" means "serving as an example, instance, or illustration," and should not necessarily be construed as preferred or advantageous over other embodiments disclosed herein. In addition, reference to an "implementation" of the present disclosure or invention includes a specific reference to one or more embodiments thereof, and vice versa, and is intended to provide illustrative examples without limiting the scope of the invention, which is indicated by the appended claims rather than by the following description.

As used throughout this application the words "can" and "may" are used in a permissive sense (i.e., meaning having the potential to), rather than the mandatory sense (i.e., meaning must). Additionally, the terms "including," "having," "involving," "containing," "characterized by," as well as variants thereof (e.g., "includes," "has," "involves," "contains," etc.), and similar terms as used herein, including within the claims, shall be inclusive and/or open-ended, shall have the same meaning as the word "comprising" and variants thereof (e.g., "comprise" and "comprises"), and do not exclude additional un-recited elements or method steps, illustratively.

It will be noted that, as used in this specification and the appended claims, the singular forms "a," "an" and "the" include plural referents unless the context clearly dictates otherwise. Thus, for example, reference to a singular referent (e.g., "computer system") includes one, two, or more referents. Similarly, reference to a plurality of referents should be interpreted as comprising a single referent and/or a plurality of referents unless the content and/or context clearly dictate otherwise. For example, reference to referents in the plural form (e.g., "computer systems") does not necessarily require a plurality of such referents. Instead, it will be appreciated that independent of the inferred number of referents, one or more referents are contemplated herein unless stated otherwise.

Various alterations and/or modifications of the inventive features illustrated herein, and additional applications of the principles illustrated herein, which would occur to one skilled in the relevant art and having possession of this disclosure, can be made to the illustrated embodiments without departing from the spirit and scope of the invention as defined by the claims, and are to be considered within the scope of this disclosure. Thus, while various aspects and embodiments have been disclosed herein, other aspects and embodiments are contemplated. While a number of methods and components similar or equivalent to those described herein can be used to practice embodiments of the present disclosure, only certain components and methods are described herein.

It will also be appreciated that systems, devices, products, kits, methods, and/or processes, according to certain embodiments of the present disclosure may include, incorporate, or otherwise comprise properties, features (e.g., components, members, elements, parts, and/or portions) described in other embodiments disclosed and/or described herein. Accordingly, the various features of certain embodiments can be compatible with, combined with, included in, and/or incorporated into other embodiments of the present disclosure. Thus, disclosure of certain features relative to a specific embodiment of the present disclosure should not be construed as limiting application or inclusion of said features to the specific embodiment. Rather, it will be appreciated that other embodiments can also include said features, members, elements, parts, and/or portions without necessarily departing from the scope of the present disclosure.

Moreover, unless a feature is described as requiring another feature in combination therewith, any feature herein may be combined with any other feature of a same or different embodiment disclosed herein. Furthermore, various well-known aspects of illustrative systems, methods, apparatus, and the like are not described herein in particular detail in order to avoid obscuring aspects of the example embodiments. Such aspects are, however, also contemplated herein.

The present disclosure may be embodied in other specific forms without departing from its spirit or essential characteristics. The described embodiments are to be considered in all respects only as illustrative and not restrictive. The scope of the invention is, therefore, indicated by the appended claims rather than by the foregoing description. While certain embodiments and details have been included herein and in the attached disclosure for purposes of illustrating embodiments of the present disclosure, it will be apparent to those skilled in the art that various changes in the methods, products, devices, and apparatus disclosed herein may be made without departing from the scope of the disclosure or of the invention, which is defined in the appended claims. All changes which come within the meaning and range of equivalency of the claims are to be embraced within their scope.

What is claimed is:

1. A method comprising:
   receiving a first dataset comprising a plurality of discrete portions representing discrete portions of textual information;
   for each discrete portion in the first dataset, performing a reversible first conversion on the discrete portion including at least:
      mapping each discrete portion within the first dataset to a table that correlates the respective discrete portion to a discrete mathematical representation of the respective discrete portion; and
      adding the discrete mathematical representation of the respective discrete portion to a second dataset that is separate from the first dataset;
   identifying one or more groupings of the mathematical representations within the second dataset;
   for at least one of the one or more grouping, performing an irreversible second conversion by combining the discrete mathematical representations within the at least one grouping into a blended mathematical representation wherein the blended mathematical representation includes contextual meaning associated with the first dataset;
   creating a third dataset comprising at least the blended mathematical representation of the at least one grouping; and
   discarding the first dataset and the second dataset.

2. The method of claim 1, further comprising performing the irreversible second conversion on each of the one or more groupings such that a single blended mathematical representation is generated for each of the one or more groupings, wherein the third dataset comprises the single mathematical representations generated for each of the one or more groupings.

3. The method of claim 1, wherein the mathematical representation of each discrete portion comprises a numerical value representing a color.

4. The method of claim 3, wherein the second dataset comprises the mathematical representations of the respective discrete portions.

5. The method of claim 3, wherein the irreversible second conversion comprises performing the weighted averaging function.

6. The method of claim 1, wherein the one or more groupings are configured according to a context associated with the grouping such that each mathematical representation within a particular grouping shares the context.

7. A system comprising:
one or more processors; and
one or more storage devices having stored thereon instructions that, when executed by the one or more processors, cause the system to perform operations to:
receive a first dataset comprising a plurality of discrete portions representing discrete portions of textual information;
for each discrete portion in the first dataset, perform a reversible first conversion on the discrete portion including at least:
mapping each discrete portion within the first dataset to a table that correlates the respective discrete portion to a discrete mathematical representation of the respective discrete portion; and
adding the discrete mathematical representation of the respective discrete portion to a second dataset that is separate from the first dataset;
identify one or more groupings of the mathematical representations within the second dataset;
for at least one of the one or more grouping, perform an irreversible second conversion by combining the discrete mathematical representations within the at least one grouping into a blended mathematical representation wherein the blended mathematical representation includes contextual meaning associated with the first dataset;
create a third dataset comprising at least the blended mathematical representation of the at least one grouping; and
discard the first dataset and the second dataset.

8. The system of claim 7, wherein the irreversible second conversion on each of the one or more groupings is performed such that a single blended mathematical representation is generated for each of the one or more groupings, wherein the third dataset comprises the single mathematical representations generated for each of the one or more groupings.

9. The system of claim 7, wherein the mathematical representation of each discrete portion comprises a numerical value representing a color.

10. The system of claim 9, wherein the second dataset comprises the mathematical representations of the respective discrete portions.

11. The system of claim 9, wherein the irreversible second conversion comprises performing the weighted averaging function.

12. The system of claim 7, wherein the one or more groupings are configured according to a context associated with the grouping such that each mathematical representation within a particular grouping shares the context.

* * * * *